US011165987B2

(12) United States Patent
Harpole et al.

(10) Patent No.: US 11,165,987 B2
(45) Date of Patent: Nov. 2, 2021

(54) SHARING VIDEO FOOTAGE FROM AUDIO/VIDEO RECORDING AND COMMUNICATION DEVICES

(71) Applicant: Amazon Technologies, Inc., Seattle, WA (US)

(72) Inventors: Aaron Harpole, Santa Monica, CA (US); Joshua Roth, Pacific Palisades, CA (US); James Siminoff, Pacific Palisades, CA (US); Darrell Sommerlatt, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/505,569

(22) Filed: Jul. 8, 2019

(65) Prior Publication Data
US 2019/0335136 A1   Oct. 31, 2019

Related U.S. Application Data

(63) Continuation of application No. 15/387,444, filed on Dec. 21, 2016, now Pat. No. 10,447,963.
(Continued)

(51) Int. Cl.
*H04N 5/77* (2006.01)
*H04L 29/08* (2006.01)
(Continued)

(52) U.S. Cl.
CPC .......... *H04N 5/772* (2013.01); *G06K 9/00771* (2013.01); *G11B 27/19* (2013.01);
(Continued)

(58) Field of Classification Search
CPC .......... H04N 7/181; H04N 7/18; H04N 5/772; H04N 7/186; H04N 21/25841;
(Continued)

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 | 11/2003 |
| CN | 2792061 | 6/2006 |

(Continued)

OTHER PUBLICATIONS

Cook, John; Draw your own neighborhood home search on a map with Zillow's updated iPhone app. GeekWire.com, Nov. 28, 2011. (14 pages).

(Continued)

*Primary Examiner* — David E Harvey
(74) *Attorney, Agent, or Firm* — Lee & Hayes, P.C.

(57) ABSTRACT

Video footage captured by A/V recording and communication devices may be readily uploaded to the cloud and shared with a requesting party, such as a law enforcement agency. When a request is received from a requesting party for video footage, a set of videos meeting the criteria specified by the requesting party may be determined. Consent requests may then be sent to users associated with each of the A/V recording and communication devices that recorded the videos meeting the criteria specified by the requesting party. When user consents to share the videos are received, the video footage may be provided to the requesting party.

20 Claims, 27 Drawing Sheets

Related U.S. Application Data

(60) Provisional application No. 62/288,971, filed on Jan. 29, 2016, provisional application No. 62/271,186, filed on Dec. 22, 2015, provisional application No. 62/270,373, filed on Dec. 21, 2015.

(51) Int. Cl.

| | | |
|---|---|---|
| *G06K 9/00* | (2006.01) | |
| *H04N 7/18* | (2006.01) | |
| *H04N 21/258* | (2011.01) | |
| *H04N 21/218* | (2011.01) | |
| *H04N 21/6587* | (2011.01) | |
| *H04N 21/2187* | (2011.01) | |
| *H04N 21/431* | (2011.01) | |
| *H04N 21/472* | (2011.01) | |
| *G11B 27/19* | (2006.01) | |
| *H04N 21/235* | (2011.01) | |
| *H04N 21/239* | (2011.01) | |
| *H04N 21/2743* | (2011.01) | |
| *H04N 21/482* | (2011.01) | |
| *H04N 21/845* | (2011.01) | |

(52) U.S. Cl.
CPC ............ *H04L 67/06* (2013.01); *H04L 67/26* (2013.01); *H04N 7/18* (2013.01); *H04N 7/186* (2013.01); *H04N 21/2187* (2013.01); *H04N 21/21805* (2013.01); *H04N 21/2353* (2013.01); *H04N 21/2393* (2013.01); *H04N 21/25841* (2013.01); *H04N 21/2743* (2013.01); *H04N 21/431* (2013.01); *H04N 21/472* (2013.01); *H04N 21/4825* (2013.01); *H04N 21/6587* (2013.01); *H04N 21/8456* (2013.01); *H04N 21/25875* (2013.01)

(58) Field of Classification Search
CPC ........... H04N 21/6587; H04N 21/2187; H04N 21/431; H04N 21/472; H04N 21/2553; H04N 21/2543; H04N 21/4825; H04N 21/4856; H04N 21/21805; H04N 21/2393; H04N 21/2743; H04N 21/8456; H04N 21/186; H04N 21/2353; H04L 67/06; H04L 67/26; G06K 9/00771; G11B 27/19
See application file for complete search history.

(56) References Cited

U.S. PATENT DOCUMENTS

| | | | |
|---|---|---|---|
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,542,078 B2 | 4/2003 | Script et al. | |
| 6,546,322 B2 | 4/2003 | Williams | |
| 6,633,231 B1 | 10/2003 | Okamoto et al. | |
| 6,658,091 B1 | 12/2003 | Naidoo et al. | |
| 6,698,021 B1 | 2/2004 | Amini et al. | |
| 6,753,774 B2 | 6/2004 | Pan et al. | |
| 6,828,909 B2 | 12/2004 | Script et al. | |
| 6,970,183 B1 | 11/2005 | Monroe | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,529,411 B2 | 5/2009 | Haupt et al. | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,710,452 B1 | 5/2010 | Lindberg | |
| 7,738,917 B2 | 6/2010 | Ryley et al. | |
| 7,856,248 B1 | 12/2010 | Fujisaki | |
| 8,139,098 B2 | 3/2012 | Carter | |
| 8,144,183 B2 | 3/2012 | Carter | |
| 8,290,427 B2 * | 10/2012 | Tucker | G08B 25/085 455/3.06 |
| 8,312,660 B1 | 11/2012 | Fujisaki | |
| 8,494,340 B2 | 7/2013 | Wang et al. | |
| 8,531,522 B2 | 9/2013 | Horovitz et al. | |
| 8,593,511 B2 | 11/2013 | Ikeda et al. | |
| 8,619,136 B2 | 12/2013 | Howarter et al. | |
| 8,676,273 B1 | 3/2014 | Fujisaki | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,887,050 B1 | 11/2014 | Siracusano, Jr. | |
| 8,928,756 B2 * | 1/2015 | Wengrovitz | H04N 7/181 348/159 |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 8,970,349 B2 | 3/2015 | Gutierrez et al. | |
| 9,013,575 B2 | 4/2015 | Scalisi | |
| 9,041,812 B2 * | 5/2015 | Billau | G08B 13/19656 348/159 |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,087,386 B2 | 7/2015 | Morris et al. | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,391,945 B1 | 7/2016 | Daniel et al. | |
| 9,508,239 B1 | 11/2016 | Harrison et al. | |
| 9,674,489 B2 * | 6/2017 | Hazzani | H04N 7/181 |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,819,972 B1 | 11/2017 | Vantalon et al. | |
| 9,870,716 B1 | 1/2018 | Rao et al. | |
| 9,910,341 B2 | 3/2018 | Jung et al. | |
| 10,025,854 B2 * | 7/2018 | Gong | G06F 16/24 |
| 10,033,862 B2 | 7/2018 | Yoakum et al. | |
| 10,447,963 B2 | 10/2019 | Harpole et al. | |
| 10,643,271 B1 * | 5/2020 | Bronson | G06F 21/10 |
| 2002/0094111 A1 | 7/2002 | Puchek et al. | |
| 2002/0131768 A1 | 9/2002 | Gammenthaler | |

(56) References Cited

U.S. PATENT DOCUMENTS

| | | |
|---|---|---|
| 2002/0147982 A1 | 10/2002 | Naidoo et al. |
| 2003/0043047 A1 | 3/2003 | Braun |
| 2003/0065805 A1 | 4/2003 | Barnes, Jr. |
| 2003/0185296 A1 | 10/2003 | Masten, Jr. |
| 2003/0220835 A1 | 11/2003 | Barnes, Jr. |
| 2004/0006425 A1 | 1/2004 | Wood et al. |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0078853 A1* | 4/2005 | Buehler ............... G06T 7/254 382/103 |
| 2005/0111660 A1 | 5/2005 | Hosoda |
| 2005/0232574 A1* | 10/2005 | Kawai ............... H04N 7/18 386/337 |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0190262 A1 | 8/2006 | Roskind |
| 2006/0279628 A1 | 12/2006 | Fleming |
| 2007/0008081 A1 | 1/2007 | Tylicki et al. |
| 2007/0199076 A1 | 8/2007 | Rensin et al. |
| 2008/0222546 A1 | 9/2008 | Mudd et al. |
| 2009/0015672 A1* | 1/2009 | Clapp ............... G06F 16/78 348/143 |
| 2009/0031381 A1 | 1/2009 | Cohen et al. |
| 2009/0322874 A1 | 12/2009 | Knutson et al. |
| 2010/0066835 A1 | 3/2010 | Colciago |
| 2010/0085431 A1 | 4/2010 | Trapani |
| 2010/0225455 A1 | 9/2010 | Claiborne et al. |
| 2011/0058034 A1* | 3/2011 | Grass ............... H04N 7/18 348/143 |
| 2011/0154335 A1 | 6/2011 | Tuovinen |
| 2011/0288962 A1 | 11/2011 | Rankin, Jr. et al. |
| 2011/0289010 A1 | 11/2011 | Rankin, Jr. et al. |
| 2011/0289106 A1 | 11/2011 | Rankin, Jr. et al. |
| 2011/0289161 A1 | 11/2011 | Rankin, Jr. et al. |
| 2012/0124203 A1 | 5/2012 | Richards |
| 2012/0203925 A1 | 8/2012 | Curcio et al. |
| 2012/0284202 A1 | 11/2012 | Dalby |
| 2012/0313755 A1 | 12/2012 | Gutierrez et al. |
| 2013/0057695 A1 | 3/2013 | Huisking |
| 2013/0117365 A1 | 5/2013 | Padmanabhan et al. |
| 2013/0129307 A1* | 5/2013 | Choe ............... A63F 13/795 386/227 |
| 2014/0040309 A1 | 2/2014 | Meaney et al. |
| 2014/0047074 A1 | 2/2014 | Chung et al. |
| 2014/0101781 A1 | 4/2014 | Bouknight |
| 2014/0132772 A1 | 5/2014 | Billau et al. |
| 2014/0133831 A1* | 5/2014 | Billau ............... G08B 13/19645 386/262 |
| 2014/0160250 A1 | 6/2014 | Pomerantz et al. |
| 2014/0267716 A1 | 9/2014 | Child et al. |
| 2014/0273989 A1* | 9/2014 | Oswald ............... H04L 67/26 455/414.1 |
| 2014/0280933 A1* | 9/2014 | Oswald ............... H04L 67/18 709/225 |
| 2015/0145991 A1* | 5/2015 | Russell ............... H04N 7/181 348/143 |
| 2015/0163463 A1 | 6/2015 | Hwang et al. |
| 2015/0168144 A1* | 6/2015 | Barton ............... G06F 16/44 348/144 |
| 2015/0242444 A1 | 8/2015 | Campbell et al. |
| 2015/0290808 A1 | 10/2015 | Renkis |
| 2015/0319402 A1 | 11/2015 | Abuelsaad et al. |
| 2016/0014176 A1 | 1/2016 | Ariav et al. |
| 2016/0105644 A1 | 4/2016 | Smith et al. |
| 2016/0110972 A1* | 4/2016 | Renkis ............... G08B 13/19656 709/205 |
| 2016/0112461 A1* | 4/2016 | Othmer ............... G08G 1/20 726/29 |
| 2016/0224837 A1 | 8/2016 | Lipert et al. |
| 2017/0155737 A1 | 6/2017 | Jannink et al. |
| 2017/0177176 A1 | 6/2017 | Harpole et al. |
| 2017/0359553 A1* | 12/2017 | Kim ............... H04N 21/21805 |
| 2018/0012462 A1 | 1/2018 | Heitz, III et al. |
| 2018/0101734 A1 | 4/2018 | Lemberger et al. |
| 2018/0338120 A1 | 11/2018 | Lemberger et al. |

FOREIGN PATENT DOCUMENTS

| | | | |
|---|---|---|---|
| CN | 104618688 | 5/2015 | |
| CN | 105046386 | 11/2015 | |
| CN | 204856892 | 12/2015 | |
| EP | 0944883 | 9/1999 | |
| EP | 1480462 | 11/2004 | |
| GB | 2286283 | 8/1995 | |
| GB | 2354394 | 3/2001 | |
| GB | 2357387 | 6/2001 | |
| GB | 2400958 | 10/2004 | |
| JP | 2001103463 | 4/2001 | |
| JP | 2002033839 | 1/2002 | |
| JP | 2002091990 A | 3/2002 | |
| JP | 2002125059 | 4/2002 | |
| JP | 2002342863 | 11/2002 | |
| JP | 2002344640 | 11/2002 | |
| JP | 2002354137 | 12/2002 | |
| JP | 2002368890 | 12/2002 | |
| JP | 2003283696 | 10/2003 | |
| JP | 2004128835 | 4/2004 | |
| JP | 2004193690 A | 7/2004 | |
| JP | 2005341040 | 12/2005 | |
| JP | 2006147650 | 6/2006 | |
| JP | 2006262342 | 9/2006 | |
| JP | 2006352515 A | 12/2006 | |
| JP | 2007158496 A | 6/2007 | |
| JP | 2007280020 A | 10/2007 | |
| JP | 2008112402 A | 5/2008 | |
| JP | 2008199531 B1 | 8/2008 | |
| JP | 2009008925 | 1/2009 | |
| JP | 2009060477 A | 3/2009 | |
| JP | 2014049865 A | 3/2014 | |
| KR | 100868257 B1 | 11/2008 | |
| KR | 20090086092 A | 8/2009 | |
| KR | 101312539 B1 | 9/2013 | |
| WO | WO9839894 | 9/1998 | |
| WO | WO0113638 | 2/2001 | |
| WO | WO0193220 | 12/2001 | |
| WO | WO02085019 | 10/2002 | |
| WO | WO03028375 | 4/2003 | |
| WO | WO03096696 | 11/2003 | |
| WO | WO-2005062268 A1 * | 7/2005 | ....... G08B 13/19641 |
| WO | WO2006038760 | 4/2006 | |
| WO | WO2006067782 | 6/2006 | |
| WO | WO2007125143 | 11/2007 | |
| WO | WO2011043732 | 4/2011 | |

OTHER PUBLICATIONS

International Search Report and Written Opinion for PCT Application PCT/US2016/068088. ISR dated Mar. 10, 2017. 11 pages.

Non Final Office Action dated Jan. 3, 2020 for U.S. Appl. No. 15/839,377 "Sharing Video Footage From Audio/Video Recording and Communication Devices" Lemberger, 9 pages.

Non Final Office Action dated Jan. 6, 2020 for U.S. Appl. No. 15/839,269 "Sharing Video Footage From Audio/Video Recording and Communication Devices" Lemberger, 8 pages.

The Chinese Office Action dated Mar. 9, 2020 for Chinese Patent Application No. 201680081300.4, a counterpart of U.S. Appl. No. 15/387,471, 8 pages.

The Korean Office Action dated May 27, 2020 for Korean Patent Application No. 10-2018-7021080, a counterpart foreing application of the U.S. Appl. No. 15/387,471, 12 pages.

The Australian Office Action dated May 12, 2020, for Australian Patent Application No. 2016377664, a counterpart foreing application of the U.S. Appl. No. 15/387,47, 4 pages.

Australian Office Action dated Sep. 21, 2020 for Australian Patent Application No. 2016377664, a counterpart foreign application of U.S. Appl. No. 15/387,471, 4 pages.

(56) References Cited

OTHER PUBLICATIONS

Chinese Office Action dated Sep. 30, 2020 for Chinese Patent Application No. 201680081300.4, a counterpart foreign application of U.S. Appl. No. 15/387,471, 7 pages.
Japanese Office Action dated Nov. 10, 2020 for Japanese Patent Application No. 2018-531135, a counterpart foreign application of U.S. Appl. No. 15/387,471, 10 pages.
Korean Office Action dated May 27, 2020 for Korean Patent Application No. 10-2018-7021080, a counterpart foreign application of the U.S. Appl. No. 15/387,471, 12 pages.
Korean Office Action dated Oct. 15, 2020 for Korean Patent Application No. 10-2018-7021080, a counterpart foreing application of U.S. Appl. No. 15/387,471, 8 pages.
Office Action for U.S. Appl. No. 15/387,471, dated Jul. 9, 2020, Harpole, "Sharing Video Footage From Audio/Video Recording and Communication Devices", 16 Pages.
Office Action for U.S. Appl. No. 15/387,471, dated Nov. 25, 2020, Harpole, Sharing Video Footage From Audio/Video Recording and Communication Devices, 20 Pages.

* cited by examiner

FIG. 5

- 07/04/2015 12:14 PM
  4085 W 7th St
- 07/04/2015 12:14 PM
  4019 W 7th St
- 07/04/2015 12:14 PM
  821-827 Crenshaw Blvd
- 07/04/2015 12:14 PM
  821-827 Crenshaw Blvd    New
- 07/04/2015 12:14 PM
  964 4th Ave
- 07/04/2015 12:14 PM
  707 S Norton Ave
- 07/04/2015 12:14 PM
  809 Westchester Pl
- 07/04/2015 12:14 PM
  4056 Wilshire Blvd

FIG. 6

*Filter By* | All | New | Flagged | Hidden

*Select By* Address ▼  — 424

Sat Jul 4 2015 12:14 — Mon Jul 6 2015 05:14

| 07/04/2015 12:14 PM
4019 W 7th St

| 07/04/2015 12:14 PM
821-827 Crenshaw Blvd    New

| 07/04/2015 12:14 PM
964 4th Ave

| 07/04/2015 01:14 PM
4056 Wilshire Blvd    New

| 07/04/2015 04:14 PM
809 Westchester Pl

| 07/04/2015 08:14 PM
4085 W 7th St

| 07/05/2015 02:14 AM
809 Westchester Pl    New

| 07/05/2015 4:14 AM
809 Westchester Pl    New

600

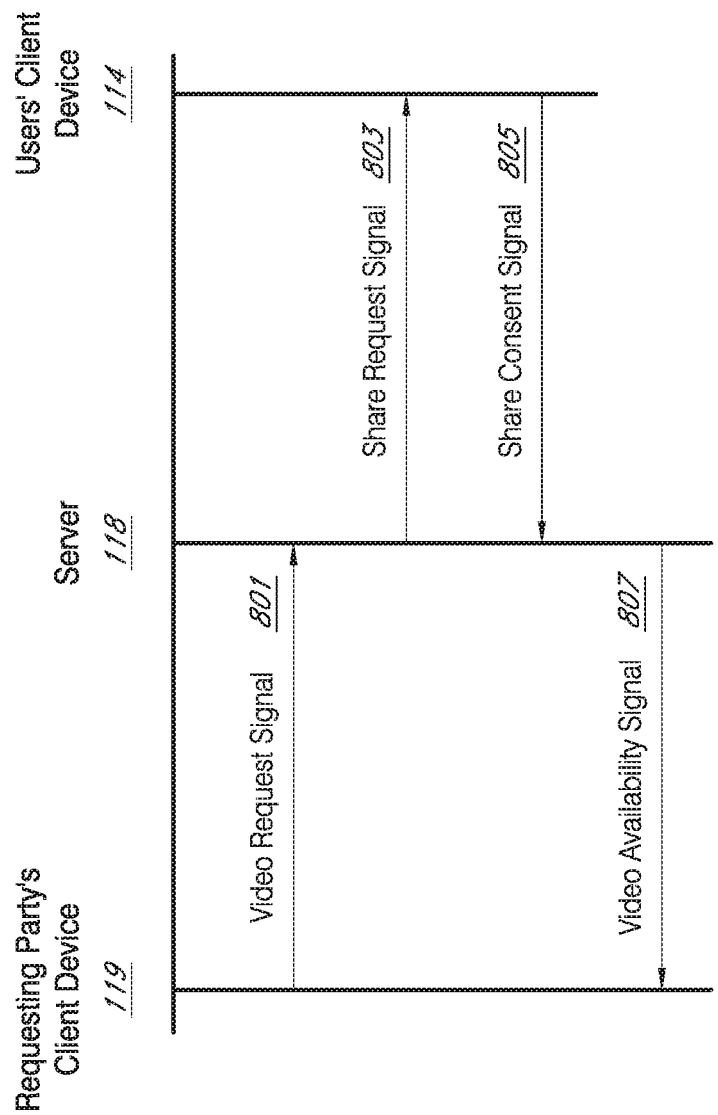

SHARING VIDEO FOOTAGE FROM AUDIO/VIDEO RECORDING AND COMMUNICATION DEVICES

CROSS-REFERENCE TO RELATED APPLICATIONS

This application is a continuation of U.S. application Ser. No. 15/387,444, filed on Dec. 21, 2016, which claims priority to provisional application Ser. No. 62/288,971, filed on Jan. 29, 2016, provisional application Ser. No. 62/271,186, filed on Dec. 22, 2015, and provisional application Ser. No. 62/270,373, filed on Dec. 21, 2015. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments improve the functionality of A/V recording and communication devices by facilitating easy sharing of video footage recorded by such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present apparatus, systems, and methods for sharing video footage from audio/video recording and communication devices now will be discussed in detail with an emphasis on highlighting the advantageous features. These embodiments depict the novel and non-obvious apparatus, systems, and methods for sharing video footage from audio/video recording and communication devices shown in the accompanying drawings, which are for illustrative purposes only. These drawings include the following figures, in which like numerals indicate like parts:

FIGS. 3-7 are sample screenshots of a graphical user interface (GUI) associated with a process for enabling a requesting party to request video footage from one or more A/V recording and communication devices;

FIG. 8A is a sequence diagram illustrating one embodiment of the process of FIG. 8;

DETAILED DESCRIPTION

Figure 1:
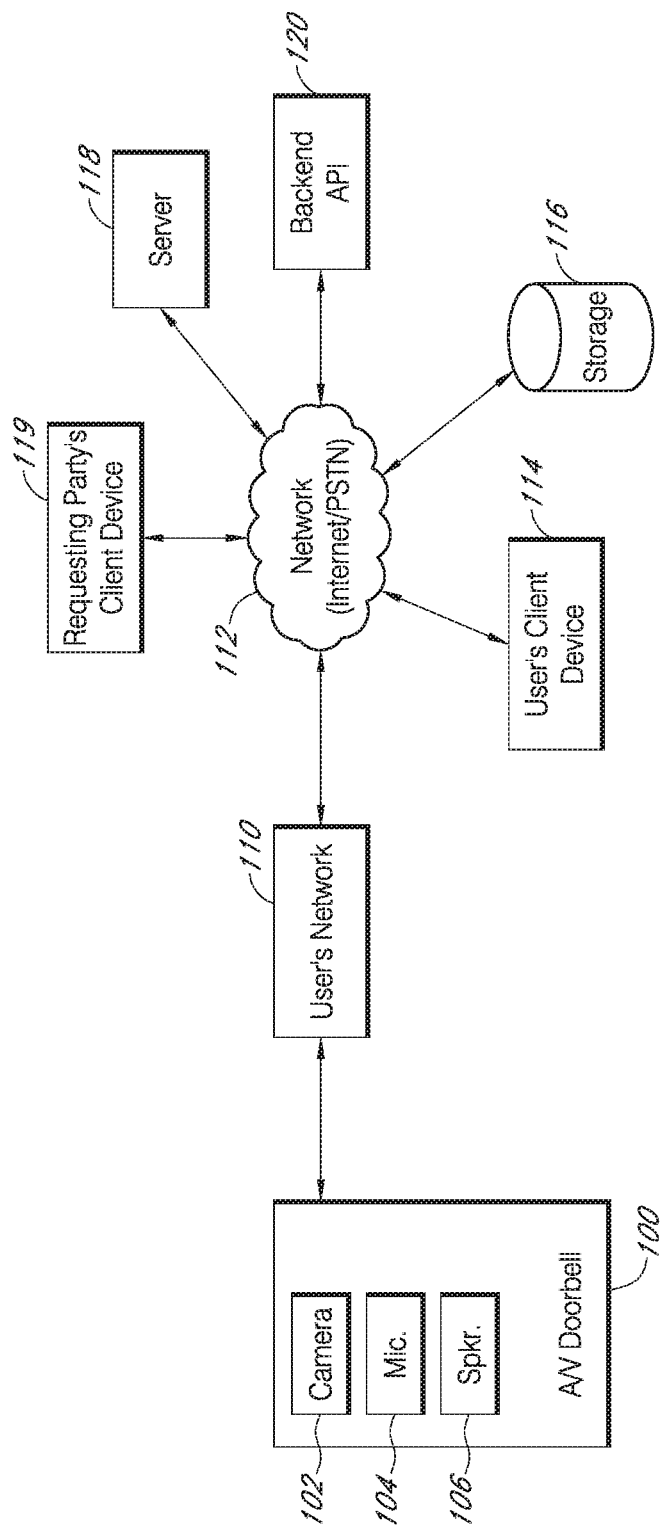
FIG. 1 is a functional block diagram illustrating a system including an A/V recording and communication device according to the present embodiments.

The various embodiments of the present apparatus, systems, and methods for sharing video footage from audio/video recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that audio/video (A/V) recording and communication devices may from time to time record video footage of criminal activity and/or of criminal perpetrators. This video footage may be useful to law enforcement agencies, not only because it may be evidence of the commission of a crime and of the person(s) responsible for the crime (if the crime is caught on video), but also because it may provide information about a location of a criminal perpetrator (if, for example, the crime is not caught on video, but a person wanted for questioning in connection with a crime is recorded by the A/V recording and communication device). It would be advantageous, then, to enhance the functionality of A/V recording and communication devices by facilitating easy sharing of video footage recorded by such devices with law enforcement. The present embodiments, as described in detail below, provide this enhancement. In particular, the present embodiments enable video footage captured by A/V recording and communication devices to be readily uploaded to the cloud and shared with a requesting party, such as a law enforcement agency. The footage from these A/V recording and communication devices, which may contain images of the perpetrator(s) of the crime and/or other valuable information, may then be used in identifying and/or capturing the perpetrator(s), thereby making communities safer.

The following detailed description describes the present embodiments with reference to the drawings. In the drawings, reference numbers label elements of the present embodiments. These reference numbers are reproduced below in connection with the discussion of the corresponding drawing features.

The embodiments of the present apparatus, systems, and methods for sharing video footage from audio/video recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) communication doorbell 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication doorbell 100 is typically located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720 p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (U.S. application Ser. No. 14/499,828) and 2015/0022618 (U.S. application Ser. No. 14/334,922), both of which are incorporated herein by reference in their entireties as if fully set forth.

With further reference to FIG. 1, the A/V recording and communication doorbell 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with the user's client device 114 via the user's network 110 and the network 112 (Internet/PSTN). The user's client device 114 may comprise, for example, a personal computer, such as a desktop computer, a laptop computer, a tablet, etc. The user's client device 114 may further comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence using a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

One aspect of the present embodiments includes the realization that audio/video (A/V) recording and communication devices may from time to time record video footage of criminal activity and/or of criminal perpetrators. This video footage may be useful to law enforcement agencies, not only because it may be evidence of the commission of a crime and of the person(s) responsible for the crime (if the crime is caught on video), but also because it may provide information about a location of a criminal perpetrator (if, for example, the crime is not caught on video, but a person wanted for questioning in connection with a crime is recorded by the A/V recording and communication device). It would be advantageous, then, to enhance the functionality of A/V recording and communication devices by facilitating easy sharing of video footage recorded by such devices with law enforcement. The present embodiments, as described in detail below, provide this enhancement. In particular, the present embodiments enable video footage captured by A/V recording and communication devices to be readily uploaded to the cloud and shared with a requesting party, such as a law enforcement agency. The footage from these A/V recording and communication devices, which may contain images of the perpetrator(s) of the crime and/or other valuable information, may then be used in identifying and/or capturing the perpetrator(s), thereby making communities safer.

Figure 2:
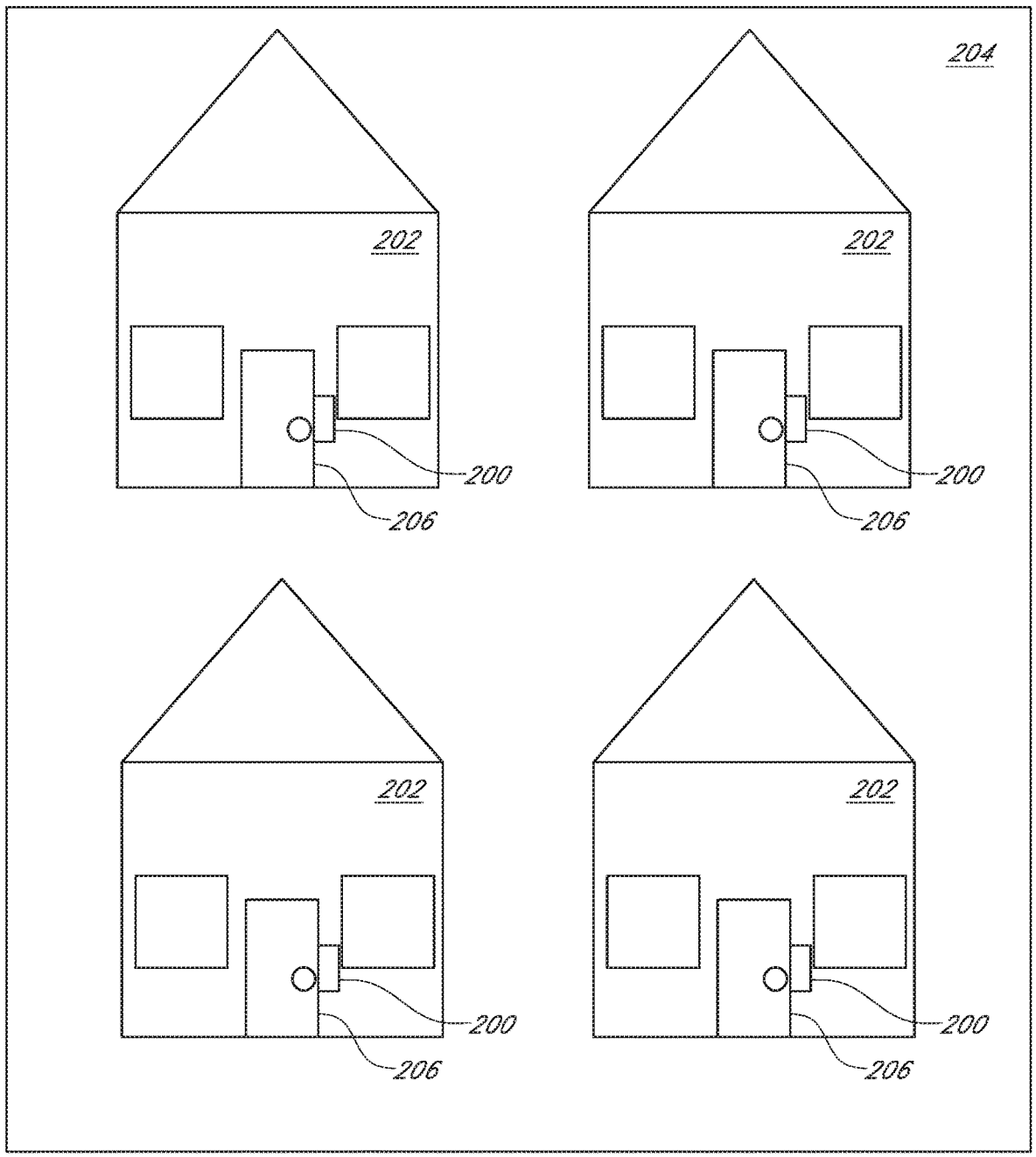
FIG. 2 is a functional block diagram illustrating a system for sharing video footage from A/V doorbells according to the present embodiments.

FIG. 2 illustrates a plurality of A/V recording and communication doorbells 200 mounted on the exteriors of a plurality of homes 202 in a neighborhood 204. Each of the A/V recording and communication doorbells 200 is mounted near the entrance 206 of its respective home 202, such that each A/V recording and communication doorbell 200 is configured to capture video footage (and, in some embodiments, accompanying audio) from an area adjacent to and within the field of view of the camera of the respective A/V recording and communication doorbell 200. The video footage may be uploaded and stored in the cloud, as described above. According to the present embodiments, and as described in detail below, the video footage captured by each of the A/V recording and communication doorbells 200 and uploaded to the cloud can be shared with a requesting party, such as a law enforcement agency. For example, law enforcement may desire to gather video footage from one or more A/V doorbells that are located in the same vicinity as a crime that has occurred. The footage from these A/V doorbells may contain images of the perpetrator(s) of the crime and/or other valuable information that may aid in identifying and/or capturing the perpetrator(s).

Figure 3:
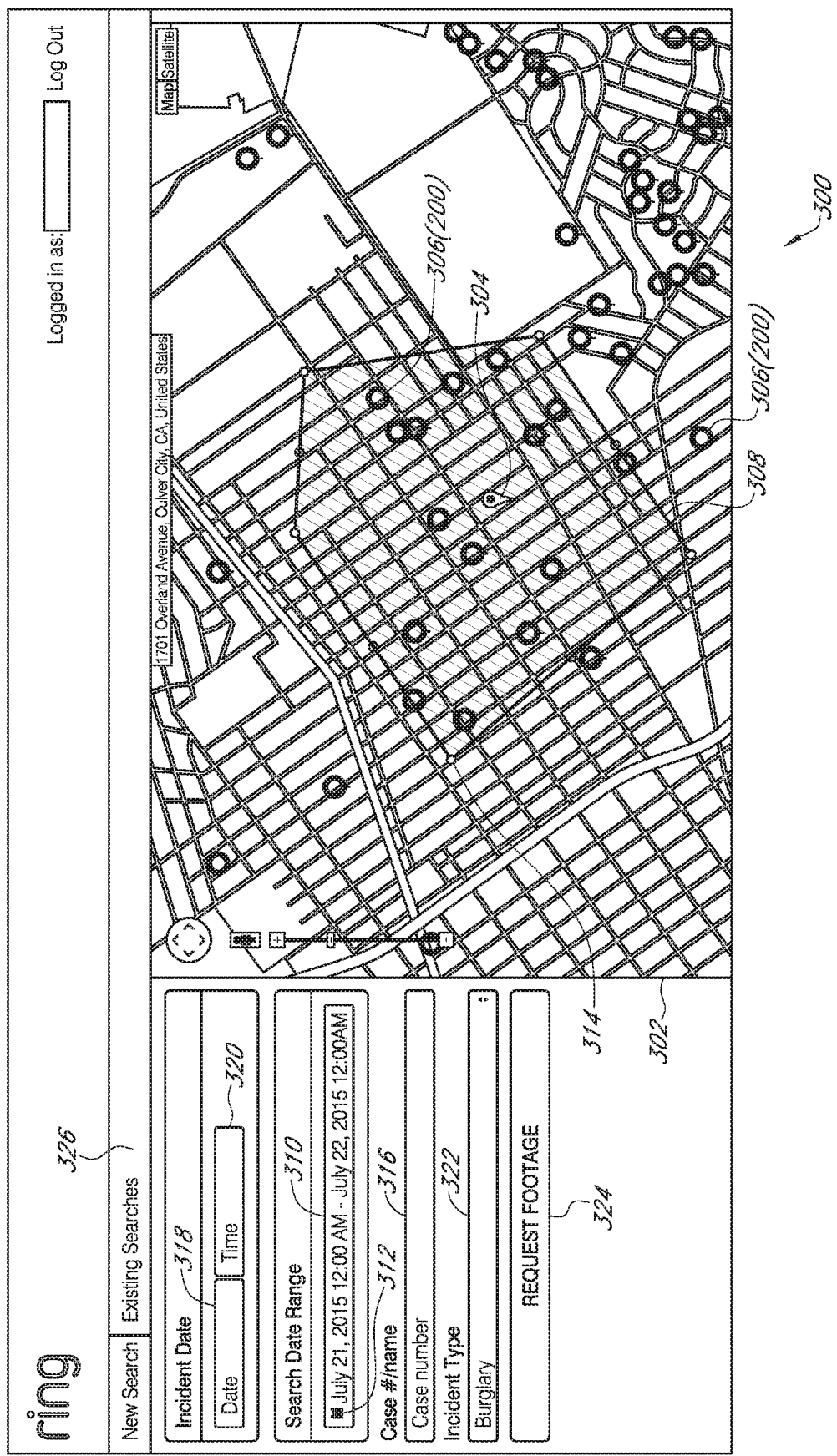

FIG. 3 illustrates one example of a graphical user interface (GUI 300) associated with a process for enabling a requesting party (or "requester") to request video footage from one or more A/V doorbells. The process, or program, may be embodied in code executable by one or more processors. The requesting party may, for example, login through a user portal at a website using a client device (requesting party's client device 119, FIG. 1). The requesting party's client device 119 may comprise, for example, a personal computer, such as a desktop computer, a laptop computer, a tablet, etc. The requesting party's client device 119 may further comprise, for example, a mobile telephone (may also be referred to as a cellular telephone), such as a smartphone, a personal digital assistant (PDA), or another communication device.

With further reference to FIG. 3, at the GUI 300 the requester may enter an address that identifies a location around which the requester wishes to gather video footage. The GUI 300 then displays a map 302 of the area 308 around the address. An icon of a first type 304 may indicate the location of the entered address on the map 302. The map 302 may further display one or more additional icons a second type 306 that indicate the locations of A/V recording and communication doorbells 200 (FIG. 2). The requester may specify an area 308 of interest (from which the requester wishes to gather video footage) by indicating the area 308 on the map 302. The GUI 300 identifies the locations of A/V recording and communication doorbells 200 within the specified area 308 by displaying them on the map 302 within the defined area 308. The GUI 300 may further include a mechanism, such as a text box 310 or a calendar 312, that enables the requester to specify a range of dates and/or times. If the requester enters a date range, the video footage provided to the requester is restricted to the specified date range.

The requester may specify the area 308 from which video footage will be gathered in any of a variety of ways. For example, the requester may draw a polygon of any shape and size on the map 302 of the GUI 300 by specifying locations of vertices 314 of the polygon, such as by touching the locations of the vertices 314, if the requester's client device includes a touchscreen, or by using a pointing device, such as a mouse or a trackball, and an onscreen pointer to specify the locations of the vertices 314. In certain embodiments, the polygon specified by the requester may not have any vertices 314, such as a circle. The requester in such an embodiment may specify an area of interest by providing a radius around the address (indicated on the map 302 by the icon of the first type 304) that the requester has entered.

With further reference to FIG. 3, the GUI 300 may also include one or more text boxes and/or dropdown menus that enable the requester to identify a given request with a case number or incident number 316, to specify an incident date 318 and/or time 320, and to specify an incident type 322. The GUI 300 may further include a button 324 that the requester presses after entering information in the text boxes and/or dropdown menus. Pressing the button 324 may cause the program to execute and return the video footage specified by the requester. The GUI 300 may also include a tab 326 that enables the requester to access previous (or existing) searches.

Figure 4:
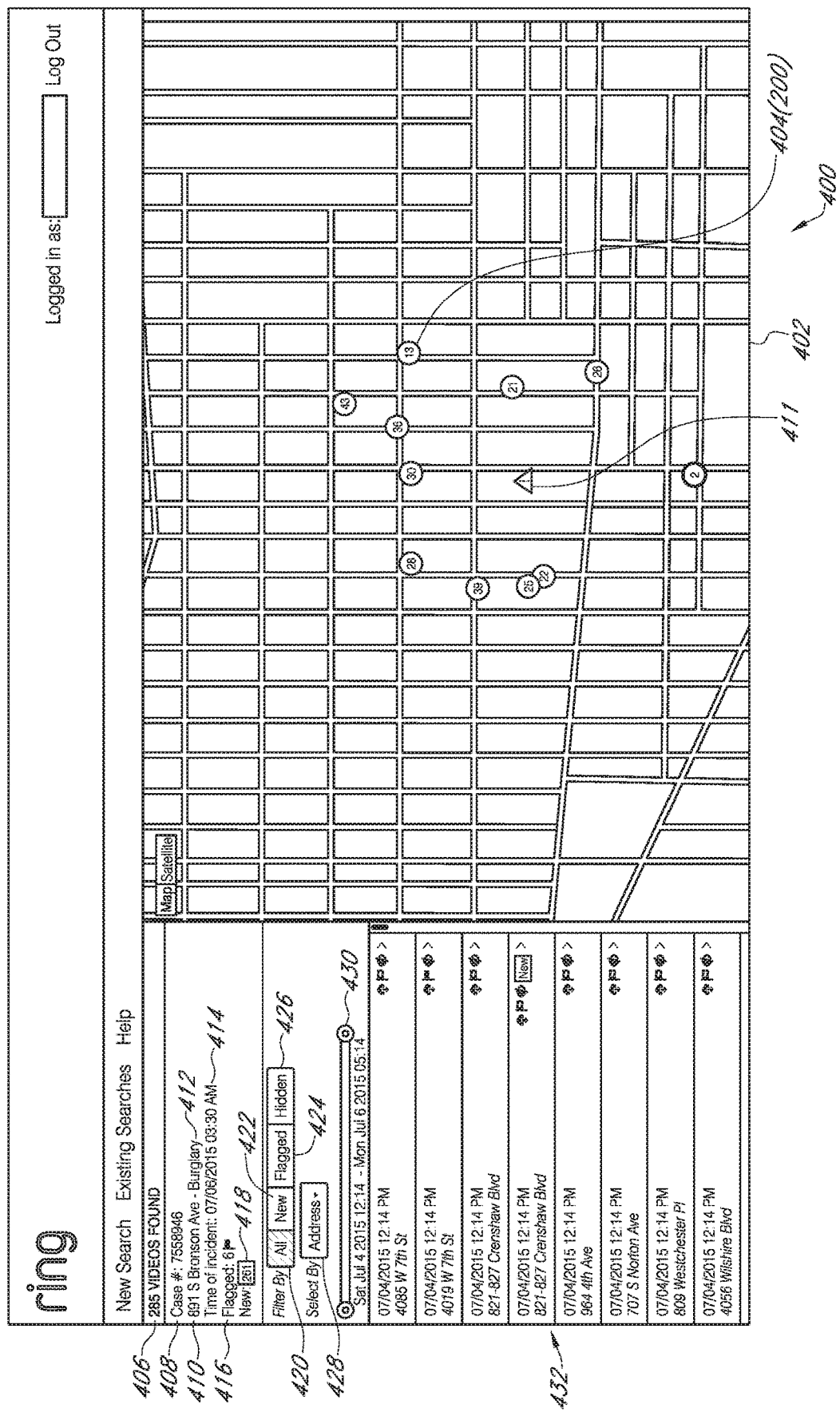

After the requester specifies an area 308, and optionally a date range 310/312 and/or any other criteria, as described above, the process identifies the video footage meeting the criteria specified by the requester, and returns the identified video footage to the requester. For example, FIG. 4 illustrates one example of a GUI 400 for presenting identified video footage to the requester. The GUI 400 includes a map 402 showing locations of A/V recording and communication doorbells 200 that have video footage meeting the requester's criteria. Icons 404 on the map 402 indicate the locations of the A/V recording and communication doorbells 200. In the illustrated embodiment, each icon 404 includes a number that indicates the number of videos associated with that A/V recording and communication doorbell 200 that meet the requester's criteria. The GUI 400 may present additional information, such as the total number of videos 406 that meet the requester's criteria, a case number 408, the address 410 where the incident occurred, an incident icon 411 on the map 402 indicating the location of the address 410 where the incident occurred, the type of incident (such as a burglary 412), the date and time 414 of the incident, a first counter 416 that indicates the number of flagged videos (described in further detail below), a second counter 418 that indicates the number of new videos (described in further detail below), one or more filter buttons 420, 422, 424, 426, a dropdown menu 428 for selecting videos by address, and/or a date range selector 430.

With further reference to FIG. 4, the GUI 400 may further present a list of the videos 432 that meet the requester's criteria. With reference to FIG. 4 and to FIG. 5, which presents a magnified view of the video list 432, each video in the list 432 may include identifying information, such as the address 500 where the A/V doorbell that recorded the video is located, and/or the date and time 502 that the video was recorded. With further reference to FIG. 5, each video in the list 432 may further include a download icon 504, a flag icon 506, a hide icon 508, a new icon 510, and/or other icons (not shown). If the requester selects the download icon 504, the video associated with that download icon 504 is downloaded to the requester's client device 119. If the requester selects the flag icon 506, the video associated with that flag icon 506 is added to the group of "flagged" videos, and the appearance of the flag icon 506 may change. For example, in the illustrated embodiment the color of the flag icon 506 changes from gray to red when selected. The requester may subsequently narrow the list of videos shown by selecting the Flagged filter button 424 (FIG. 4), after which only those videos that have been flagged are shown in a modified list 600, as illustrated in FIG. 6.

With reference to FIGS. 4 and 5, if the user selects the hide icon 508 next to a given video, the video associated with that hide icon 508 may disappear from the list 432. The user may subsequently see a list of only hidden videos by selecting the Hidden filter button 426 (FIG. 4). With reference to FIG. 5, the new icon 510 identifies videos that have recently been recorded and/or uploaded to the cloud, and/or that the requester has not yet viewed. After the requester views a video that includes a new icon 510, the new icon 510 may no longer appear next to that video in the list 432. If the requester selects the New filter button 422 (FIG. 4), the videos displayed in the list 432 may include only those that include the new icon 510.

With further reference to FIG. 4, the GUI 400 may further present a dropdown address menu 428 that allows the user to narrow the videos in the list 432 to only those associated with the A/V doorbell at a particular address. The GUI 400 may further present a selectable date range 430. In the illustrated embodiment, the selectable date range 430 includes a slider at either end. By moving the sliders, the user may narrow or broaden the date range, after which the program will narrow or broaden the videos displayed in the list 432 to include only those videos that fall within the specified date range.

Figure 7:
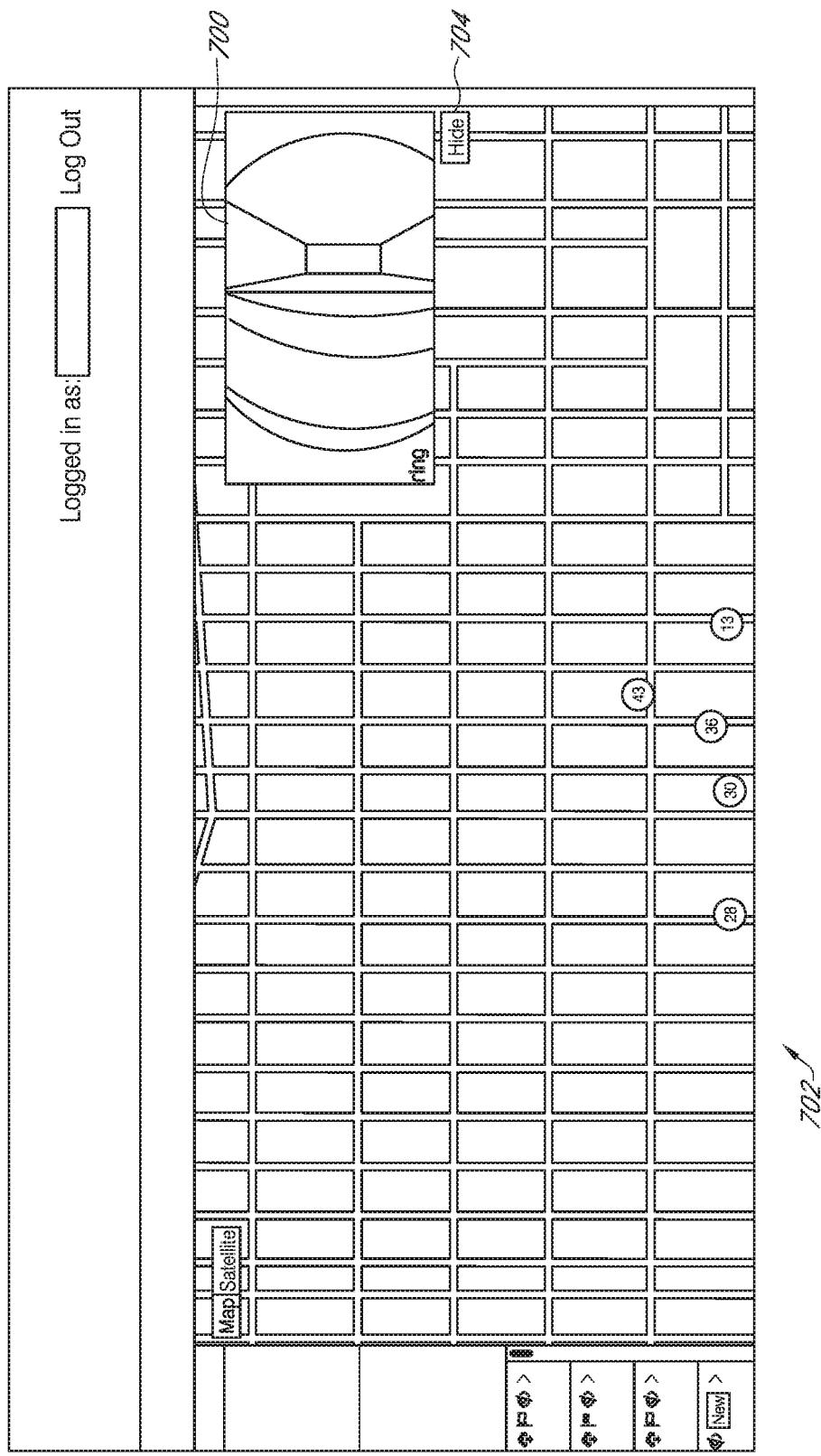

With reference to FIG. 7, when the user selects one of the videos from the list 432, such as by double-clicking on the selected video, the selected video 700 may playback within a portion of the GUI 702. In the illustrated embodiment, the selected video 700 plays in the upper-right corner of the GUI 702, but in other embodiments the selected video 700 may play in a different portion of the GUI 702, or may open in a new window, for example. The GUI 702 may further include a Hide button 704 that causes the selected video 700 to disappear from the GUI 702 when the Hide button 704 is selected.

Figure 8:
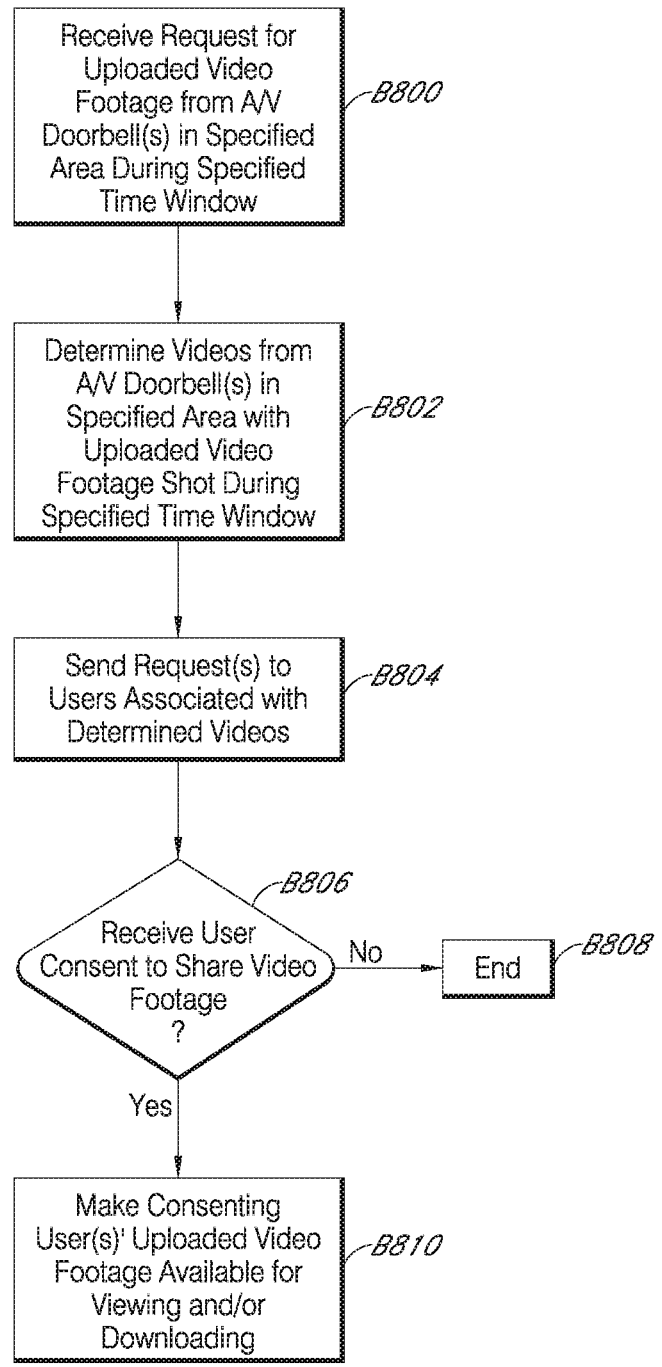
FIG. 8 is a flowchart illustrating a process for sharing video footage from A/V recording and communication doorbells according to the present embodiments.

FIG. 8 is a flowchart illustrating a process for sharing video footage from A/V doorbells according to the present embodiments, and FIG. 8A is a sequence diagram illustrating one embodiment of the process of FIG. 8. With reference to FIG. 8, the process begins at block B800, when a request is received from a requesting party for video footage recorded by one or more A/V doorbells in a specified area and during a specified time window. The requesting party may be, for example, a law enforcement agency. With reference to FIG. 8A, the requesting party may submit the request to the network 112 in a video request signal 801 sent from the requesting party's client device 119 (FIG. 1) to a network device, such as the server 118 (or the backend API 120 or another network device). The requesting party's client device 119 may be, for example, a computer that connects to the network 112 using a web browser, and the requesting party may submit the request through a web portal provided on the network 112, such as in the example illustrated above with respect to FIGS. 3-7.

For example, with reference to FIG. 3, the requesting party may access the web portal on the network 112 and enter an address in a search box (not shown). The web portal may then display the map 302 of the area around the entered address, with an icon of a first type 304 identifying the entered address and a plurality of icons of a second type 306 identifying the locations of A/V recording and communication doorbells 200 in the vicinity of the entered address 304. The requesting party may then specify the area of interest 308 as described above with respect to FIG. 3, and also specify the time window of interest. For example, the requesting party may enter a beginning date and time and an ending date and/or time using one or more text boxes 310, dropdown menus, popup calendars 312, etc. In some embodiments, the ending date and/or time may be in the future, and/or the request may be open ended, meaning that the requesting party does not provide an ending date and/or time. In such cases, the video footage returned to the requesting party may include videos that are uploaded from one or more of the A/V recording and communication doorbells 200 in the specified area 308 at one or more future times.

With further reference to FIG. 8, the process next moves to block B802, where it is determined which videos satisfy the criteria provided by the requester. For example, the determination process, which may be performed at the server 118 (or the backend API 120 or another network device), for example, may take as criteria the area of interest and the time window of interest, and use those criteria to search through video metadata to identify videos that meet the criteria. The result set is then a set of these video metadata records, e.g. a set of references to videos. The process then moves to blocks B804 and B806, where permissions are obtained for sharing the videos that were determined at block B802. For example, at block B804 a request for consent to share may be sent to each of the users associated with each of the A/V recording and communication doorbells 200 having at least one of the videos determined at block B802. The request for consent may comprise, for example, a push notification sent to each user's client device 114 (such as a smartphone). The push notification (or other type of request for consent) may indicate the time and date range for which sharing has been requested, may also indicate the identity of the requesting party, and/or may also lead the user to a listing of the videos that are associated with the request, which the user may also view. For example, with reference to FIG. 8A, the request for consent to share videos may comprise a share request signal (or consent request signal) 803 transmitted by the server 118 (or the backend API 120 or another network device) to one or more of the user's client devices 114 associated with the A/V recording and communication doorbells 200 having at least one of the videos determined at block B802.

Referring back to FIG. 8, then, at block B806, it is determined which of the users (if any) have provided consent to share their videos. For example, each user may respond to the push notification with a "yes" or "no." With reference to FIG. 8A, the user consents (or denials of consent) may be sent in one or more share consent signals 805 from the users' client devices 114 to the server 118 (or the backend API 120 or another network device). For those users who do not provide consent to share, the process ends at block B808 (FIG. 8). However, for those users who do provide consent to share, the process continues to block B810. At block B810, the videos from the consenting users' A/V recording and communication doorbells 200 that fall within the specified time window are presented to the requester through the web portal. For example, with reference to FIG. 4, icons 404 on the map 402 may indicate the locations of the A/V recording and communication doorbells 200 corresponding to the consenting users, and a number on each icon 404 may indicate a number of videos recorded by that A/V recording and communication doorbell 200. The list of videos 432 may be populated with the videos corresponding to the icons 404 shown on the map 402, and the requester may view the videos, flag selected ones of the videos, hide selected ones of the videos, etc., as described above with respect to FIGS. 4-7. With reference to FIG. 8A, information about the videos from the consenting users' A/V recording and communication doorbells 200 that fall within the specified time window may be sent in a video availability signal 807 from the server 118 (or the backend API 120 or another network device) to the requesting party's client device 119.

Figure 9:
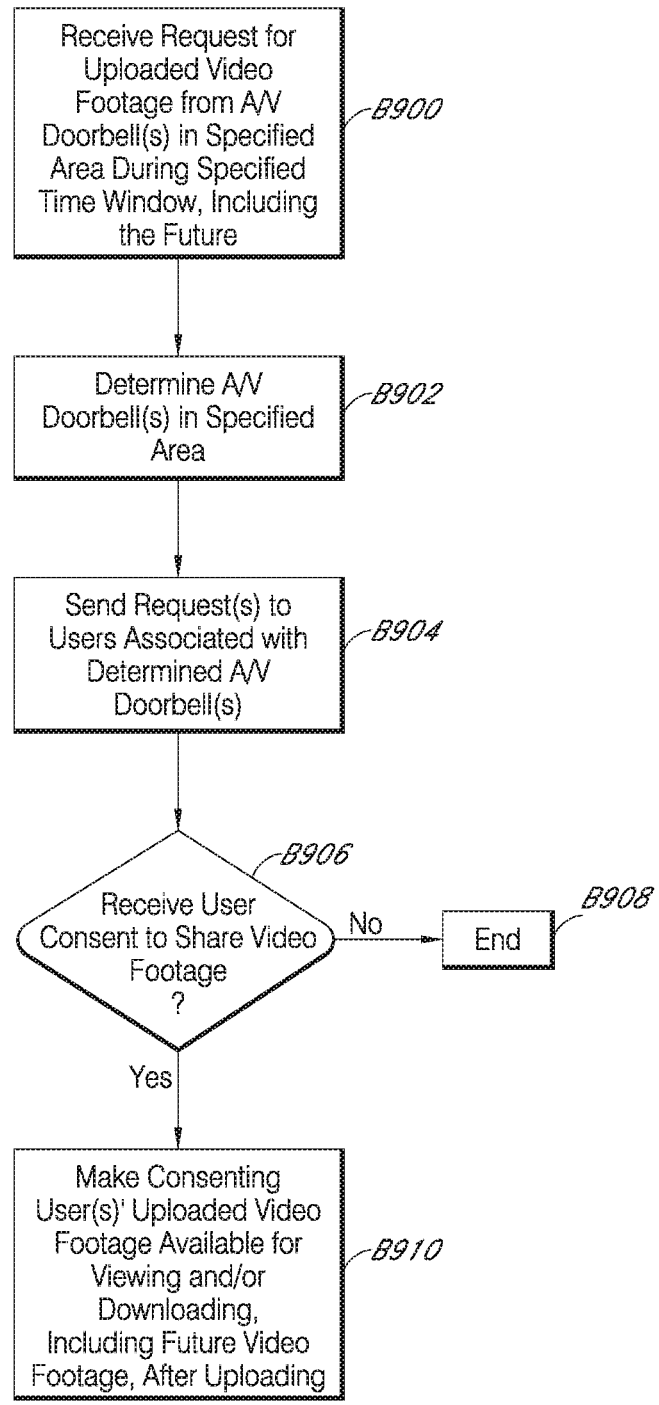
FIG. 9 is a flowchart illustrating another process for sharing video footage from A/V recording and communication doorbells according to the present embodiments.
Figure 9A:
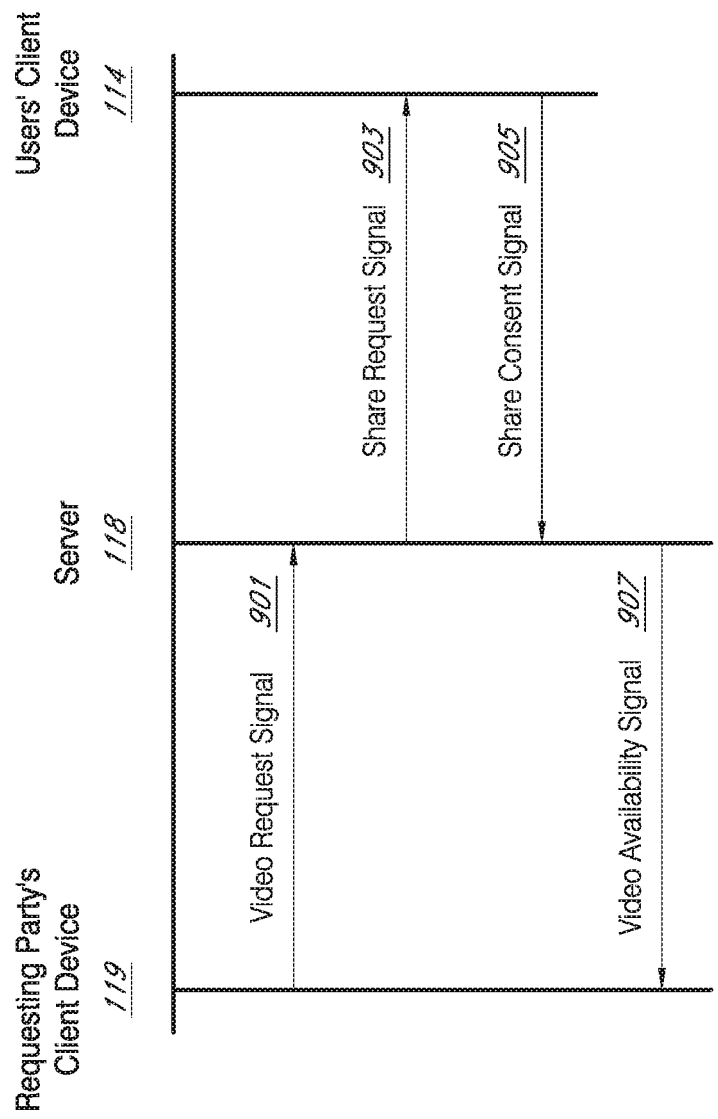
FIG. 9A is a sequence diagram illustrating one embodiment of the process of FIG. 9.

As described above, in some embodiments the requesting party may enter an ending date and/or time that is in the future, or the requester may not provide an ending date and/or time. FIG. 9 is a flowchart illustrating an example embodiment of a process for sharing video footage in situations in which the requester does not provide an ending date and/or time, and FIG. 9A is a sequence diagram illustrating one embodiment of the process of FIG. 9. The processes of FIGS. 9 and 9A may, for example, aid in stopping a crime that is currently in progress or that has recently occurred, such as when implemented close in time to a reported burglary. With reference to FIG. 9, at block B1000 a request is received from a requesting party for video footage recorded by one or more A/V recording and communication doorbells 200 in a specified area during a specified time window, where the specified time window includes the future. For example, the request may request videos from all A/V recording and communication doorbells 200 in the specified area that are recorded and uploaded from a specified start time going forward into the future. The specified start time may be a time in the past, or may simply correspond to whatever time the request is submitted. The request may identify a future end time, after which any videos recorded and uploaded by A/V recording and communication doorbells 200 in the specified area would not be shared with the requester. Alternatively, the request may not include an end time, such that all future videos recorded and uploaded by A/V recording and communication doorbells 200 in the specified area would be shared with the requester (subject to obtaining permissions from the user(s) of the A/V recording and communication doorbells 200). As in the example of FIG. 8, the requesting party may be, for example, a law enforcement agency. With reference to FIG. 9A, the requesting party may submit the request to the network 112 in a video request signal 901 sent from the requesting party's client device 119 (FIG. 1) to a network device, such as the server 118 (or the backend API 120 or another network device). The requesting party's client device 119 may be, for example, a computer that connects to the network 112 using a web browser, and the requesting party may submit the request through a web portal provided on the network 112, such as in the example illustrated above with respect to FIGS. 3-7.

With further reference to FIG. 9, the process next moves to block B902, where it is determined which A/V recording and communication doorbells 200 are located in the specified area. In other words, the process, which may be performed at the server 118 (or the backend API 120 or another network device), for example, determines a subset of all A/V recording and communication doorbells 200 that satisfy the criteria provided by the requester. The process then moves to blocks B904 and B906, where permissions are obtained for sharing the videos from the A/V recording and communication doorbells 200 that were determined at block B902. For example, at block B904 a request for consent to share may be sent to each of the users associated with each of the A/V recording and communication doorbells 200 in the subset determined at block B902. For example, with reference to FIG. 9A, the request for consent to share may comprise a share request signal (or consent request signal) 903 transmitted by the server 118 (or the backend API 120 or another network device) to one or more of the user's client devices 114 associated with the A/V recording and communication doorbells 200 determined at block B902. The request for consent may comprise, for example, a push notification sent to each user's client device 114 (such as a smartphone). The push notification (or other type of request for consent) may indicate the time and date range for which sharing has been requested, and may also indicate the identity of the requesting party.

Referring back to FIG. 9, then, at block B906, it is determined which of the users (if any) have provided consent to share their videos. For example, each user may respond to the push notification with a "yes" or "no." With reference to FIG. 9A, the user consents (or denials of consent) may be sent in one or more share consent signals 905 from the users' client devices 114 to the server 118 (or the backend API 120 or another network device). For those users who do not provide consent to share, the process ends at block B908. However, for those users who do provide consent to share, the process continues to block B910. At block B910, the videos from the consenting users' A/V recording and communication doorbells 200 are presented to the requester through the web portal. With reference to FIG. 9A, information about the videos from the consenting users' A/V recording and communication doorbells 200 may be sent in a video availability signal 907 from the server 118 (or the backend API 120 or another network device) to the requesting party's client device 119. Since the request includes future videos, those future videos are presented to the requester after they are uploaded. For example, with reference to FIG. 4, icons 404 on the map 402 may indicate the locations of the A/V recording and communication doorbells 200 corresponding to the consenting users, and a number on each icon 404 may indicate a number of videos recorded by that A/V recording and communication doorbell 200. The list of videos 432 may be populated with the videos corresponding to the icons 404 shown on the map 402, and the requester may view the videos, flag selected ones of the videos, hide selected ones of the videos, etc., as described above with respect to FIGS. 4-7.

While not shown in FIG. 9, the present embodiments may include an option for users to grant permission to share some videos that meet the criteria provided by the requesting party, and to withhold permission to share other videos that meet the criteria provided by the requesting party. For example, the push notification (or other type of request for consent) sent to the users of the A/V doorbells may include at least three response options: 1) share all videos meeting the criteria provided by the requesting party, 2) share no videos, or 3) share some videos meeting the criteria provided by the requesting party and withhold others. If the user selects option 3), the user may be presented with a menu (not shown) that enables the user to select those videos to be shared and/or to select those videos to be withheld.

In certain other embodiments, a user may provide consent to share videos prospectively. For example, when a user sets up a new A/V doorbell, one step in the setup process may present the user with a request to provide consent (to "opt-in") to share all videos recorded and uploaded by that A/V doorbell. In another example, a user may be required to provide consent to share all videos recorded and uploaded by that A/V doorbell as a condition of receiving the A/V doorbell. For example, a law enforcement agency may offer to provide A/V doorbells to users free of charge with the condition that any videos recorded and uploaded by that A/V doorbell be shared with the law enforcement agency that provided the A/V doorbell to the user.

As described above, the present embodiments advantageously enable a requesting party, such as a law enforcement agency, to request that users of A/V doorbells share video footage recorded and uploaded (to the cloud) by those A/V doorbells. Such footage can be useful to law enforcement for solving crimes and apprehending perpetrators, and for stopping crimes that may be currently in progress.

Figure 10:
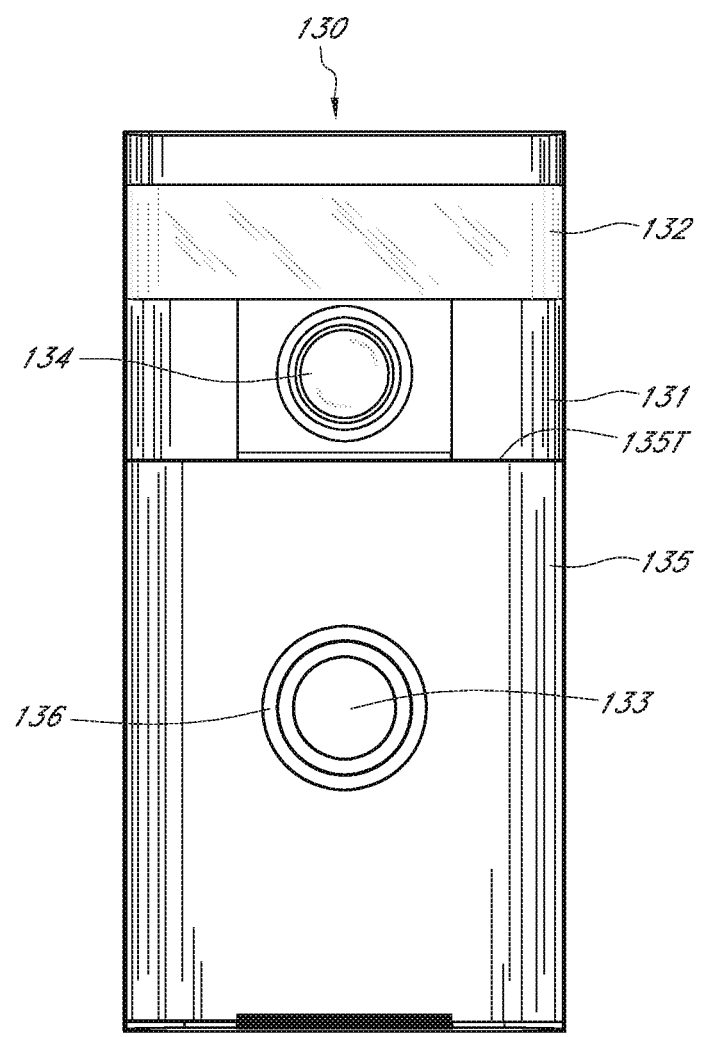
FIG. 10 is a front view of an A/V recording and communication doorbell according to an aspect of the present disclosure.
Figure 11:
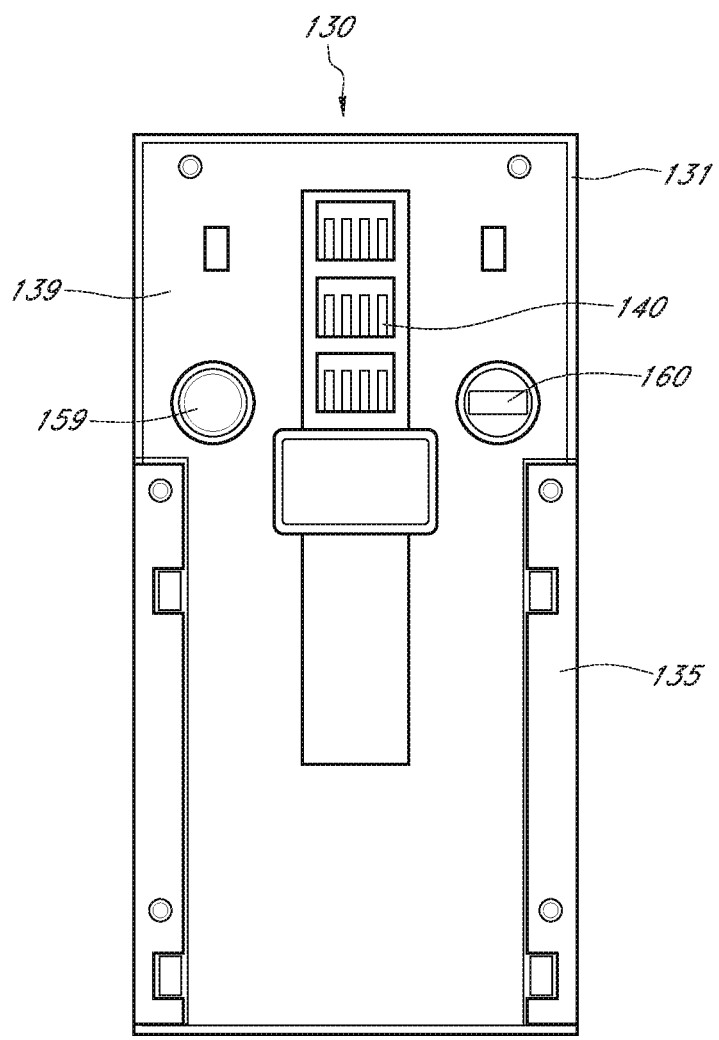
FIG. 11 is a rear view of the A/V recording and communication doorbell of FIG. 10.
Figure 12:
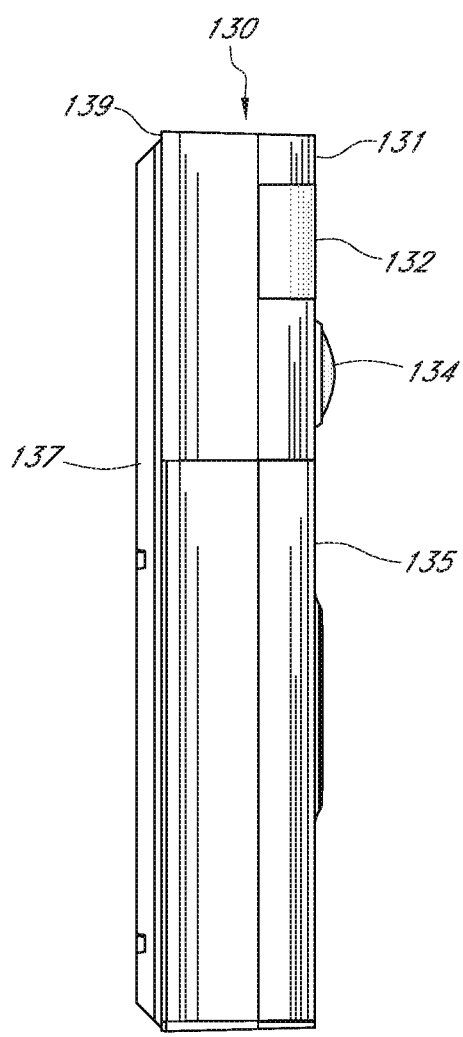
FIG. 12 is a left side view of the A/V recording and communication doorbell of FIG. 10 attached to a mounting bracket according to an aspect of the present disclosure.

FIGS. 10-12 illustrate a audio/video (A/V) communication doorbell 130 according to an aspect of present embodiments. The doorbell 130 is configured for use in the methods and systems described in the present disclosure, including those described above. FIG. 10 is a front view, FIG. 11 is a rear view, and FIG. 12 is a left side view of the doorbell 130 coupled with a mounting bracket 137. The doorbell 130 includes a faceplate 135 mounted to a back plate 139 (FIG. 11). With reference to FIG. 12, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 10, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 10 and 12, the doorbell 130 further includes an enclosure 131 that engages the faceplate 135. In the illustrated embodiment, the enclosure 131 abuts an upper edge 135T (FIG. 10) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 11 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 11, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 12 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 12, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 13:
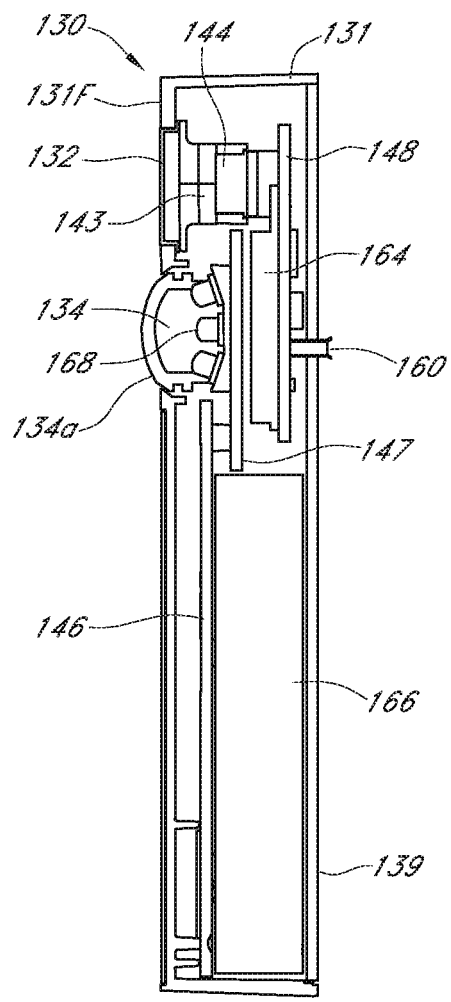
FIG. 13 is cross-sectional right side view of the A/V recording and communication doorbell of FIG. 10.

FIG. 13 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 13, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 13, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 13, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 14:
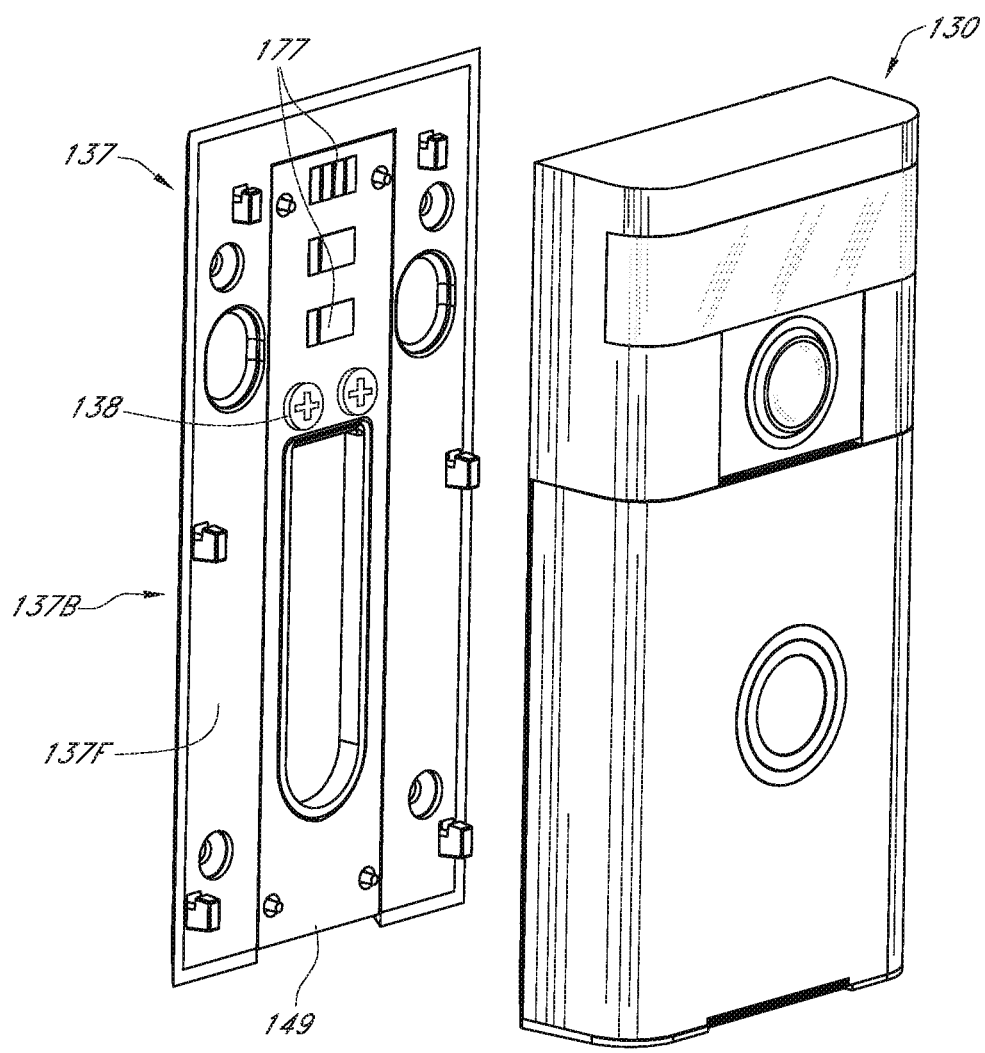
FIG. 14 is an exploded view of the A/V recording and communication doorbell and the mounting bracket of FIG. 12.

FIG. 14 is an exploded view of the doorbell 130 and the mounting bracket 137 according to an aspect of the present embodiments. The mounting bracket 137 is configured to be mounted to a mounting surface (not shown) of a structure, such as a home or an office. FIG. 14 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 14, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 15:
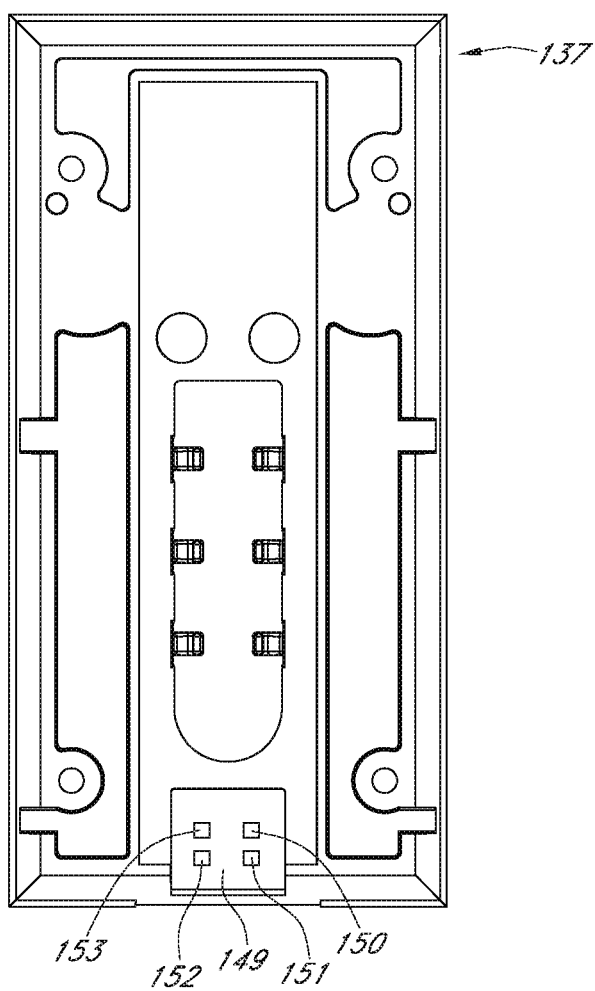
FIG. 15 is a rear view of the mounting bracket of FIG. 12.

With reference to FIGS. 14 and 15 (which is a rear view of the mounting bracket 137), the mounting bracket 137 further comprises a bracket PCB 149. With reference to FIG. 15, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 16A:
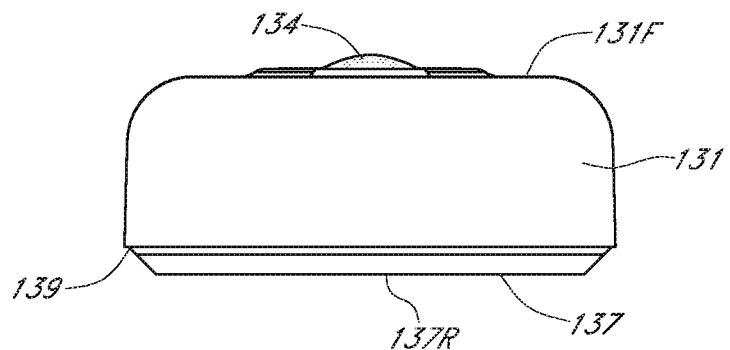
FIGS. 16A and 16B are top and bottom views, respectively, of the A/V recording and communication doorbell and the mounting bracket of FIG. 12.
Figure 16B:
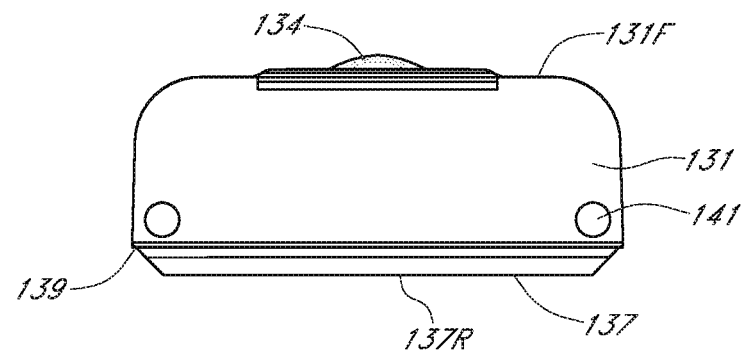

FIGS. 16A and 16B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 16B, the lower end of the enclosure 131 may include security screw apertures 141 configured to receive screws or other fasteners.

Figure 17A:
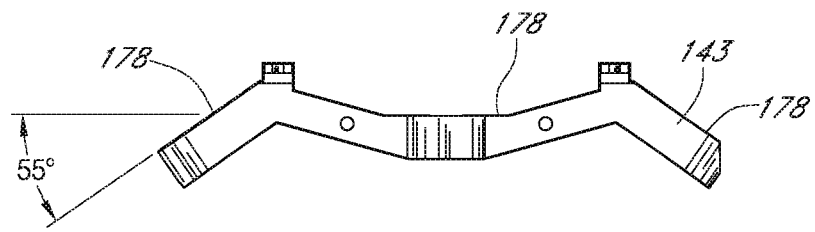
FIGS. 17A and 17B are top and front views, respectively, of a passive infrared sensor holder of the A/V recording and communication doorbell of FIG. 10.

FIG. 17A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 17A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 17B:
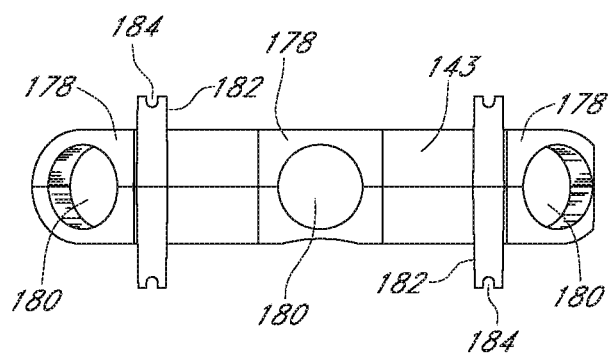

FIG. 17B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 18A:
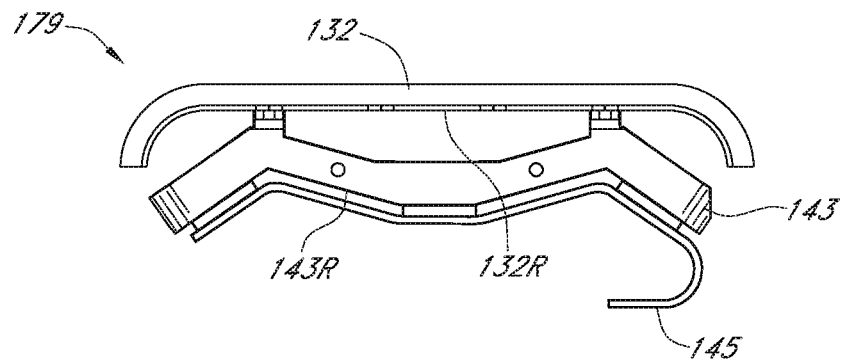
FIGS. 18A and 18B are top and front views, respectively, of a passive infrared sensor holder assembly of the A/V recording and communication doorbell of FIG. 10.
Figure 18B:
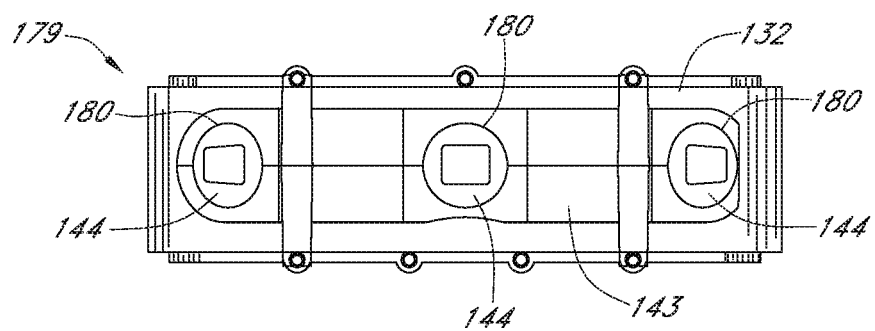

FIGS. 18A and 18B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 13).

Figure 19:
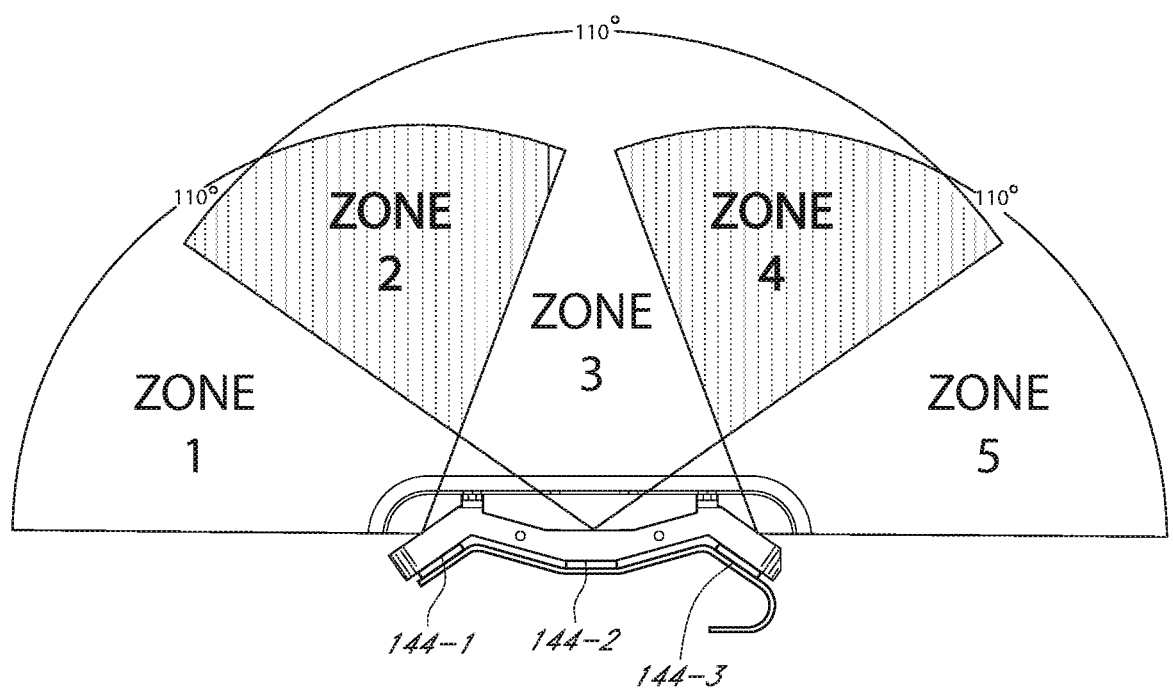
FIG. 19 is a top view of the passive infrared sensor assembly of FIG. 18A and a field of view thereof according to an aspect of the present disclosure.

FIG. 19 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 20:
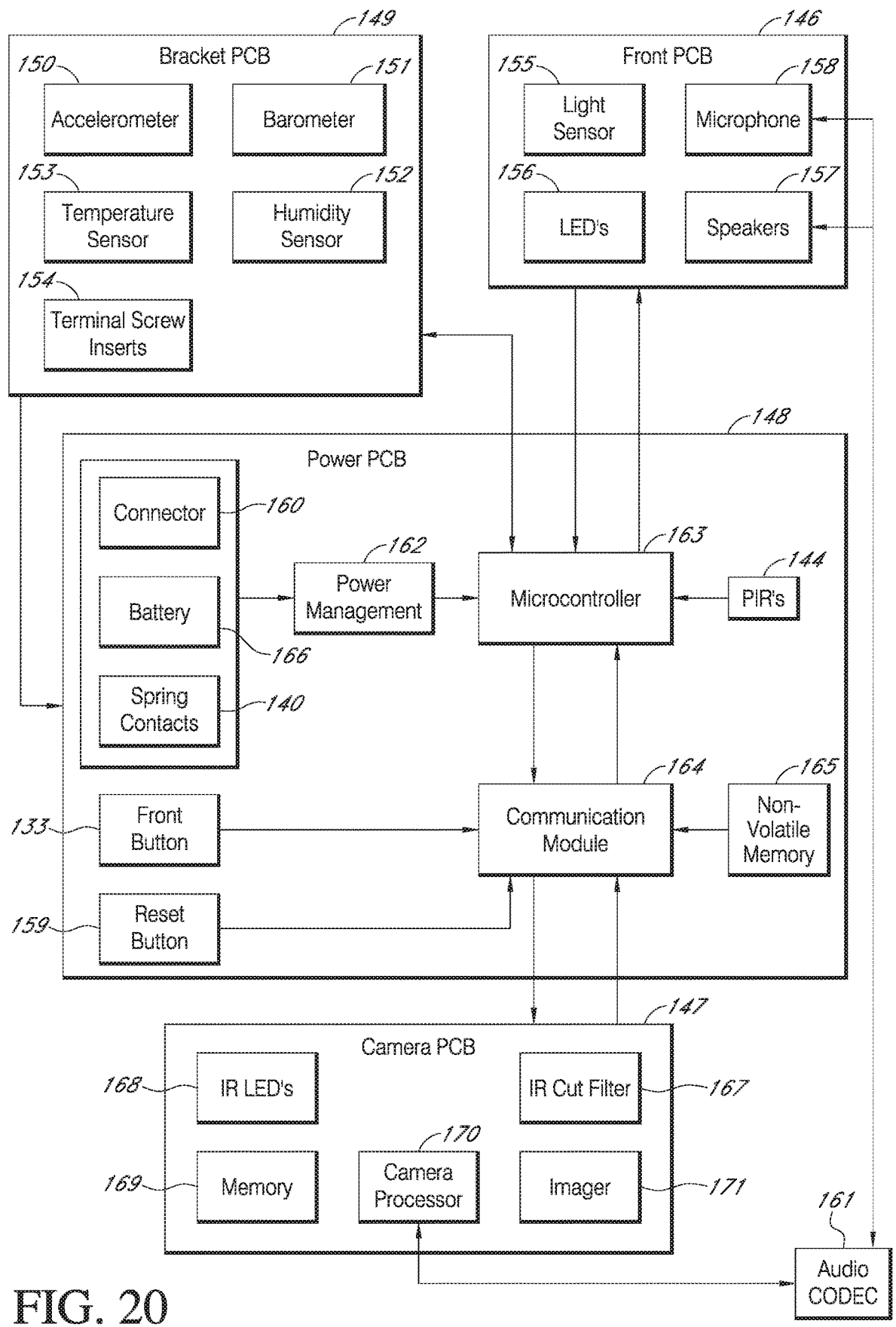
FIG. 20 a functional block diagram of the components of the A/V recording and communication doorbell of FIG. 10.

FIG. 20 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 20, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 20, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 20, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 20, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 20, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 20, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720 p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 21:
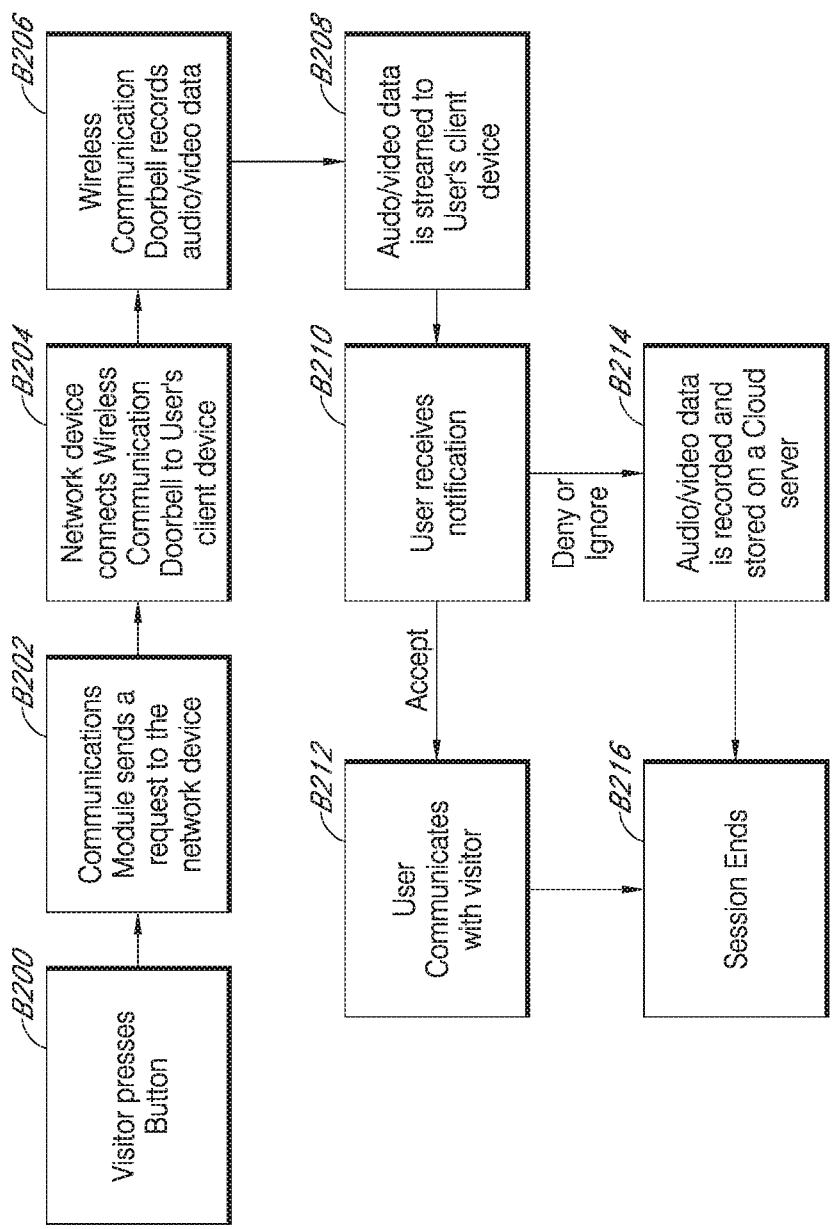
FIG. 21 is a flowchart illustrating a process for an A/V recording and communication doorbell according to an aspect of the present disclosure.

FIG. 21 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server 118. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server 118 (block B214) even if the user accepts the notification and communicates with the visitor through the user's client device 114.

Figure 22:
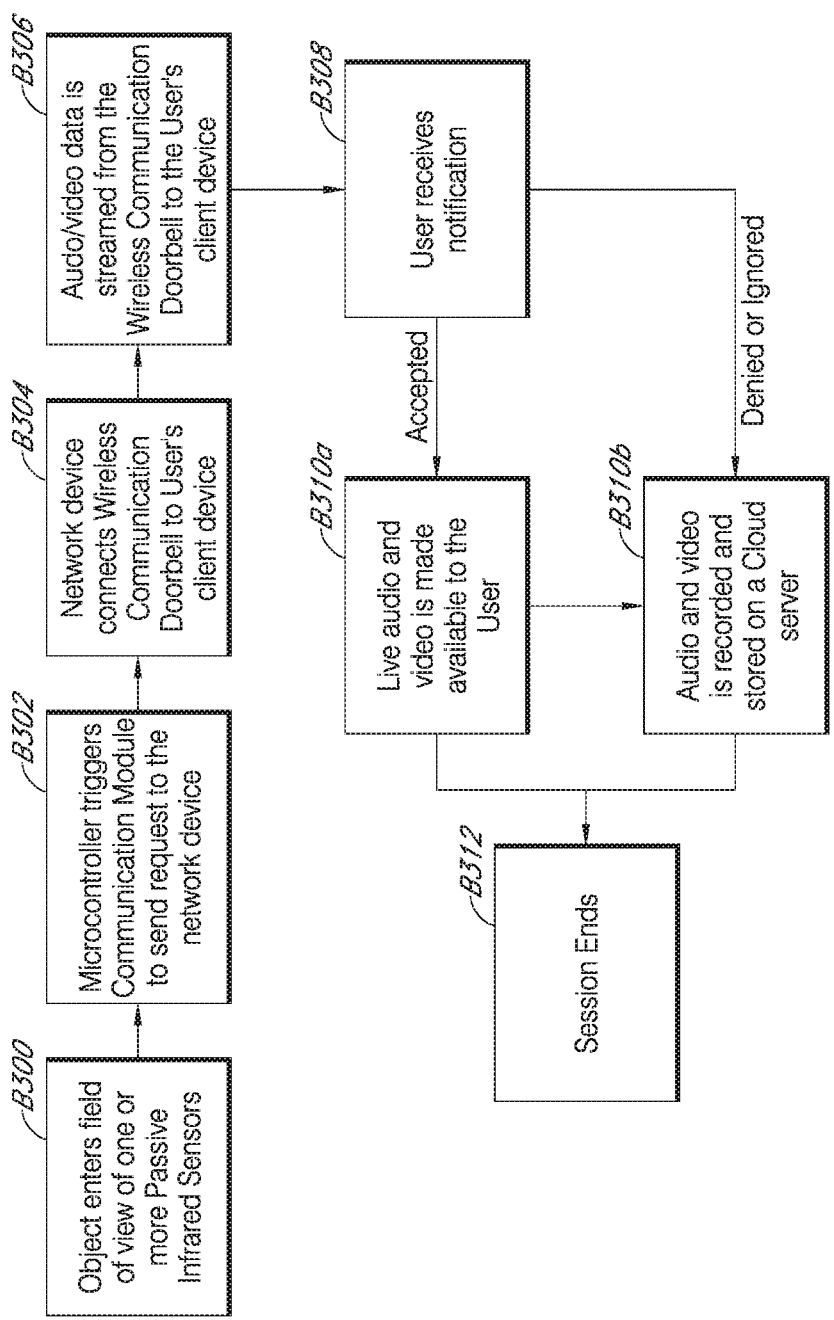
FIG. 22 is a flowchart illustrating another process for an A/V recording and communication doorbell according to an aspect of the present disclosure.

FIG. 22 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server 118 at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session. In some embodiments, the audio and/or video data may be recorded and stored at a cloud server 118 (block B310b) even if the user accepts the notification and communicates with the visitor through the user's client device 114.

Figure 23:
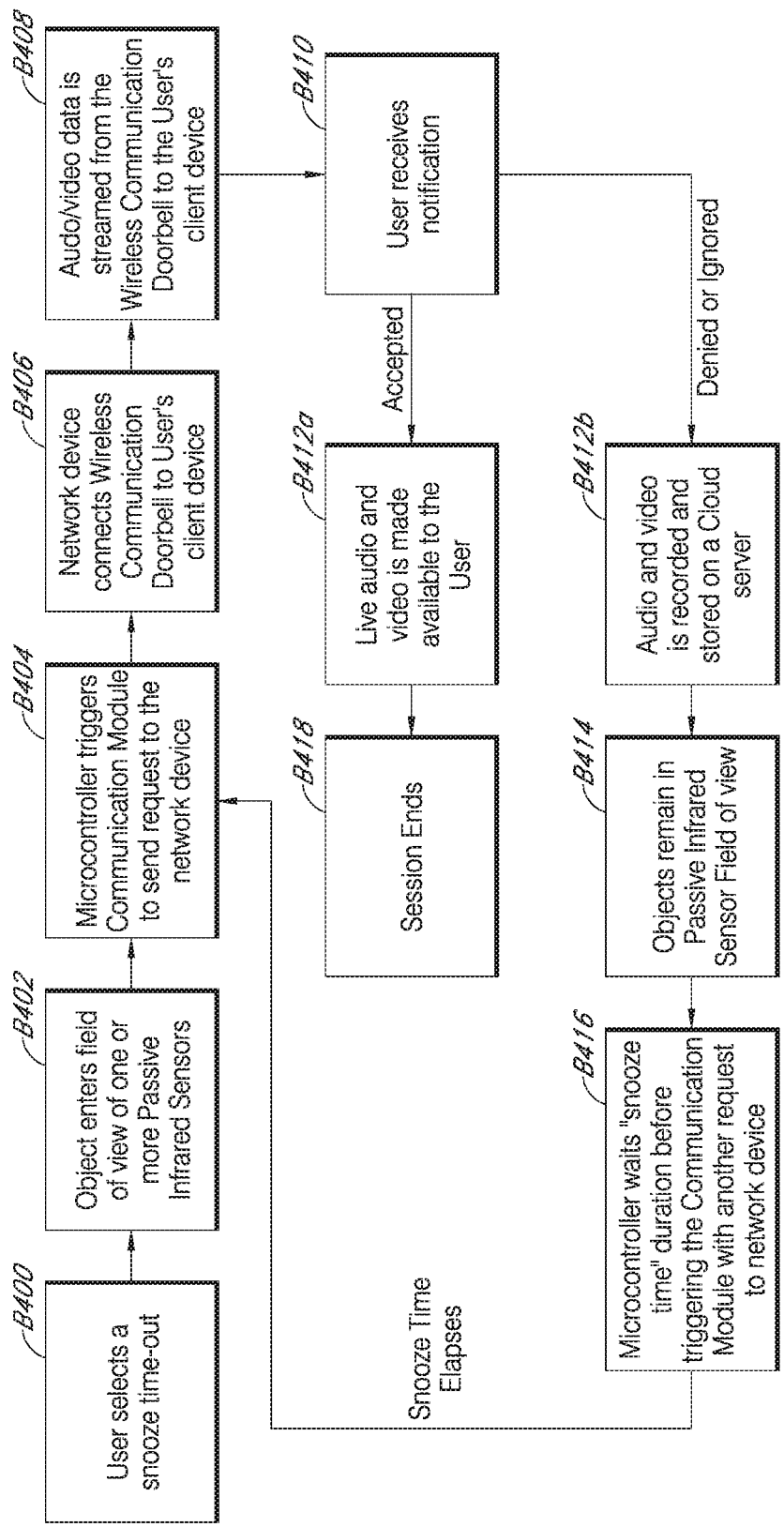
FIG. 23 is a flowchart illustrating another process for an A/V recording and communication doorbell according to an aspect of the present disclosure.

FIG. 23 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server 118. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144. In some embodiments, the audio and/or video data may be recorded and stored at a cloud server 118 (block B412b) even if the user accepts the notification and communicates with the visitor through the user's client device 114.

Figure 24:
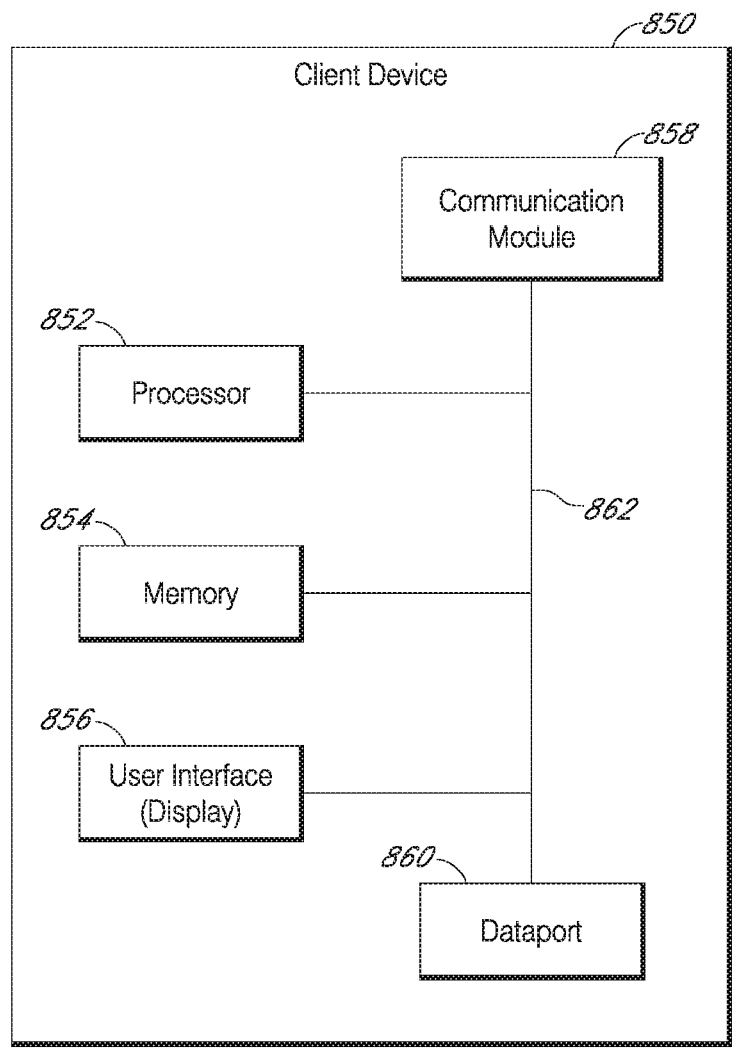
FIG. 24 is a functional block diagram of a client device on which the present embodiments may be implemented according to various aspects of the present disclosure.

FIG. 24 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a smartphone.

The present embodiments have been described with reference to the doorbell 130 illustrated in FIGS. 10-20. It should be understood, however, that the present embodiments are equally applicable to any A/V recording and communication device that is capable of recording video footage and/or audio and transmitting the recorded video footage and/or audio via wired and/or wireless connection. In certain embodiments, for example, the A/V recording and communication device may not be a doorbell, but may be, for example, an A/V recording and communication security camera.

With reference to FIG. 24, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM)). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 25:
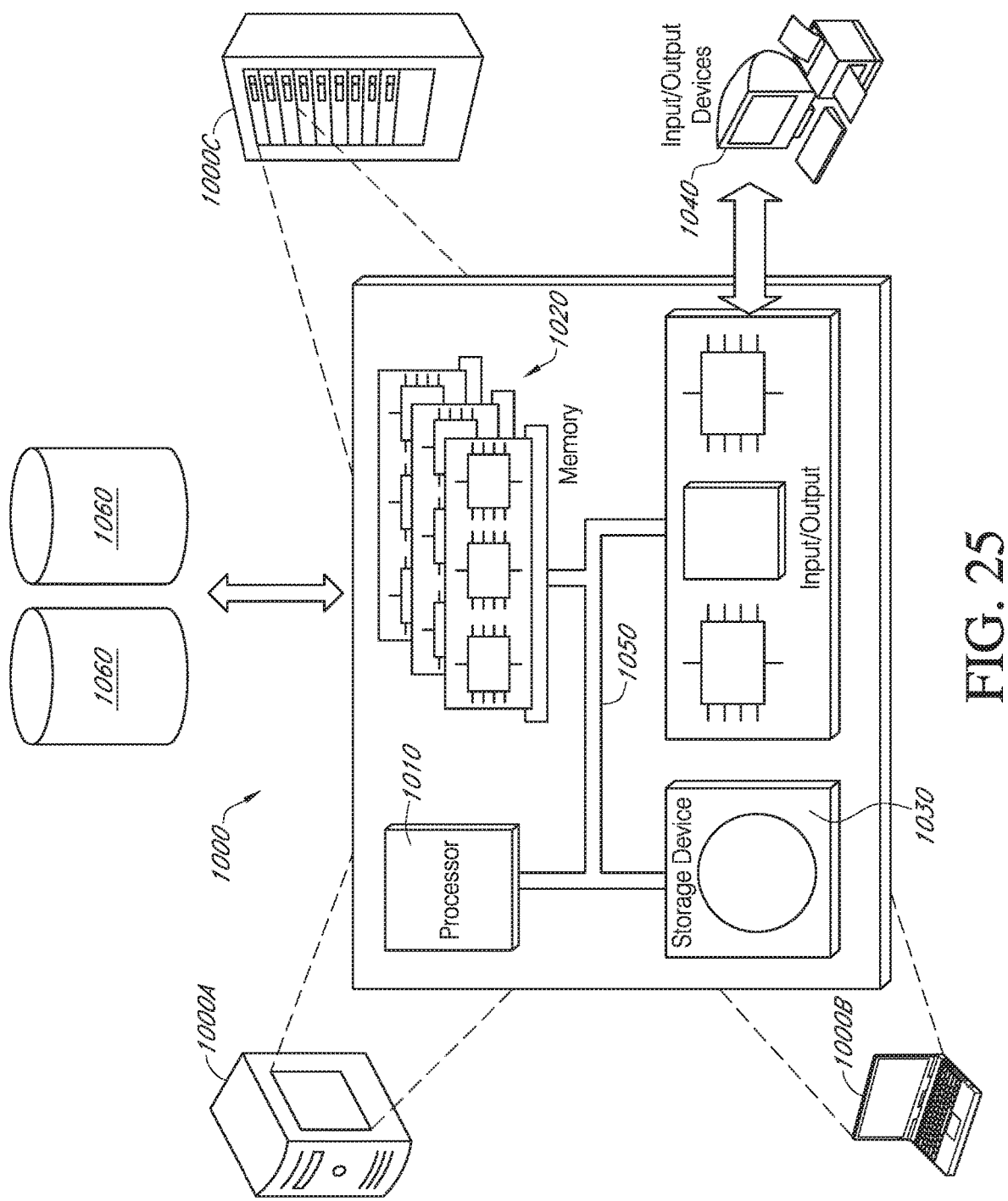
FIG. 25 is a functional block diagram of a general-purpose computing system on which the present embodiments may be implemented according to various aspects of present disclosure.

FIG. 25 is a functional block diagram of a general-purpose computing system on which the present embodiments may be implemented according to various aspects of present disclosure. The computer system 1000 may execute at least some of the operations described above. The computer system 1000 may be embodied in at least one of a personal computer (also referred to as a desktop computer) 1000A, a portable computer (also referred to as a laptop or notebook computer) 1000B, and/or a server 1000C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1000 may include at least one processor 1010, memory 1020, at least one storage device 1030, and input/output (I/O) devices 1040. Some or all of the components 1010, 1020, 1030, 1040 may be interconnected via a system bus 1050. The processor 1010 may be single- or multi-threaded and may have one or more cores. The processor 1010 may execute instructions, such as those stored in the memory 1020 and/or in the storage device 1030. Information may be received and output using one or more I/O devices 1040.

The memory 1020 may store information, and may be a computer-readable medium, such as volatile or non-volatile memory. The storage device(s) 1030 may provide storage for the system 1000, and may be a computer-readable medium. In various aspects, the storage device(s) 1030 may be a flash memory device, a hard disk device, an optical disk device, a tape device, or any other type of storage device.

The I/O devices 1040 may provide input/output operations for the system 1000. The I/O devices 1040 may include a keyboard, a pointing device, and/or a microphone. The I/O devices 1040 may further include a display unit for displaying graphical user interfaces, a speaker, and/or a printer. External data may be stored in one or more accessible external databases 1060.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, a method is provided, the method comprising receiving a request from a requesting party for video footage recorded by one or more audio/video (A/V) recording and communication devices in a specified area during a specified time window, wherein each of the A/V recording and communication devices includes a camera; determining videos that were recorded by at least a subset of the A/V recording and communication devices in the specified area during the specified time window; sending consent requests to users associated with each of the A/V recording and communication devices in the subset; receiving at least one user consent to share at least one of the videos recorded by the A/V recording and communication devices in the subset; and providing the video footage corresponding to the at least one user consent to the requesting party.

In an embodiment of the first aspect, the specified time window includes an ending date and/or time that is in the future.

In another embodiment of the first aspect, determining the videos comprises taking as criteria the specified area and the specified time window, and using the criteria to search through video metadata to identify videos that meet the criteria.

In another embodiment of the first aspect, determining the videos returns a set of video metadata records.

In another embodiment of the first aspect, the consent requests comprise push notifications sent to client devices associated with each of the users.

In another embodiment of the first aspect, the push notifications comprise an indicator of the specified time window.

In another embodiment of the first aspect, the push notifications comprise an indicator of the requesting party.

In another embodiment of the first aspect, the push notifications comprise a listing of the videos that are associated with the request.

In another embodiment of the first aspect, the users may view the videos in the listing.

In another embodiment of the first aspect, the push notifications comprise three response options, including an option to share all videos meeting criteria provided by the requesting party, an option to share no videos, and an option to share some videos meeting the criteria provided by the requesting party and withhold others.

In another embodiment of the first aspect, the requesting party is a law enforcement agency.

In another embodiment of the first aspect, a server performs at least one of receiving the request, determining the videos, sending the consent requests, receiving the at least one user consent, and providing the video footage.

In a second aspect, a method is provided, the method comprising receiving a request from a requesting party for video footage recorded by one or more audio/video (A/V) recording and communication devices in a specified area during a specified time window, wherein the specified time window includes a defined start date and/or time, but does not include a defined end date or time, and wherein each of the A/V recording and communication devices includes a camera; determining videos that were recorded by at least a subset of the A/V recording and communication devices in the specified area after the defined start date and/or time; sending consent requests to users associated with each of the A/V recording and communication devices in the subset; receiving at least one user consent to share at least one of the videos recorded by the A/V recording and communication devices in the subset; and providing the video footage corresponding to the at least one user consent to the requesting party.

In an embodiment of the second aspect, the defined start date and/or time is in the past.

In another embodiment of the second aspect, the defined start date and/or time correspond to a time that the request is received.

In another embodiment of the second aspect, determining the videos comprises taking as criteria the specified area and the defined start date and/or time, and using the criteria to search through video metadata to identify videos that meet the criteria.

In another embodiment of the second aspect, determining the videos returns a set of video metadata records.

In another embodiment of the second aspect, the consent requests comprise push notifications sent to client devices associated with each of the users.

In another embodiment of the second aspect, the push notifications comprise an indicator of the defined start date and/or time.

In another embodiment of the second aspect, the push notifications comprise an indicator of the requesting party.

In another embodiment of the second aspect, the push notifications comprise a listing of the videos that are associated with the request.

In another embodiment of the second aspect, the users may view the videos in the listing.

In another embodiment of the second aspect, the push notifications comprise three response options, including an option to share all videos meeting criteria provided by the requesting party, an option to share no videos, and an option to share some videos meeting the criteria provided by the requesting party and withhold others.

In another embodiment of the second aspect, the requesting party is a law enforcement agency.

In another embodiment of the second aspect, a server performs at least one of receiving the request, determining the videos, sending the consent requests, receiving the at least one user consent, and providing the video footage.

In a third aspect, a method is provided, the method comprising displaying, on a display of a client device, a graphical user interface (GUI) for enabling a requester to request video footage from one or more audio/video (A/V) recording and communication devices; receiving as an input an address that identifies a location from around which the requester wishes to gather the video footage; displaying, on the GUI on the display of the client device, a map of an area around the input address; identifying, on the map, the location of the input address; identifying, on the map, locations of the one or more A/V recording and communication devices; receiving as an input an area of interest and indicating the area of interest on the map; identifying, on the map, locations of a subset of the A/V recording and communication devices that are within the area of interest; receiving as an input an execute command; and returning as an output the video footage from the subset of the A/V recording and communication devices that are within the area of interest.

In an embodiment of the third aspect, the client device comprises a desktop computer, a laptop computer, a tablet computer, a mobile telephone, a cellular telephone, a smartphone, or a personal digital assistant (PDA).

In another embodiment of the third aspect, the location of the input address is indicated on the map with an icon of a first type.

In another embodiment of the third aspect, the locations of the one or more A/V recording and communication devices are indicated on the map with icons of a second type.

Another embodiment of the third aspect further comprises receiving as an input a range of dates and/or times.

Another embodiment of the third aspect further comprises restricting the video footage provided to the requester to the range of dates and/or times.

In another embodiment of the third aspect, receiving the input of the area of interest comprises receiving an input of a polygon drawn on the map of the GUI.

In another embodiment of the third aspect, receiving the input of the area of interest comprises receiving an input of a radius around the address.

Another embodiment of the third aspect further comprises receiving as an input a case number or an incident number.

Another embodiment of the third aspect further comprises receiving as an input an incident type.

Another embodiment of the third aspect further comprises, after returning as an output the video footage from the subset of the A/V recording and communication devices that are within the area of interest, indicating with icons on the map the locations of the subset of the A/V recording and communication devices that have the video footage meeting the requester's criteria, wherein each icon includes a number that indicates a number of videos associated with that A/V recording and communication device that meet all criteria input by the requester.

In another embodiment of the third aspect, returning as an output the video footage from the subset of the A/V recording and communication devices that are within the area of interest comprises displaying, on the GUI on the display of the client device, a list of videos.

In another embodiment of the third aspect, each video in the list includes identifying information, including the address where the A/V recording and communication device that recorded each video is located, and the date and time that each video was recorded.

In another embodiment of the third aspect, each video in the list includes a download icon or button that, when selected, causes the selected video to be downloaded to the client device.

In another embodiment of the third aspect, each video in the list includes a flag icon or button that, when selected, causes the selected video to be added to a group of flagged videos.

In another embodiment of the third aspect, the method further comprises receiving as an input a command to narrow the list of videos to only those videos that are in the group of flagged videos.

In a fourth aspect, a computer program product is provided, the computer program product being embodied in code executable by a processor, which when executed causes the processor to display, on a display of a client device, a graphical user interface (GUI) for enabling a requester to request video footage from one or more audio/video (A/V) recording and communication devices; receive as an input an address that identifies a location from around which the requester wishes to gather the video footage; display, on the GUI on the display of the client device, a map of an area around the input address; identify, on the map, the location of the input address; identify, on the map, locations of the one or more A/V recording and communication devices; receive as an input an area of interest and indicate the area of interest on the map; identify, on the map, locations of a subset of the A/V recording and communication devices that are within the area of interest; receive as an input an execute command; and return as an output the video footage from the subset of the A/V recording and communication devices that are within the area of interest.

In an embodiment of the fourth aspect, the location of the input address is indicated on the map with an icon of a first type.

In another embodiment of the fourth aspect, the locations of the one or more A/V recording and communication devices are indicated on the map with icons of a second type.

In another embodiment of the fourth aspect, the code, when executed by the processor, further causes the processor to receive as an input a range of dates and/or times.

In another embodiment of the fourth aspect, the code, when executed by the processor, further causes the processor to restrict the video footage provided to the requester to the range of dates and/or times.

In another embodiment of the fourth aspect, receiving the input of the area of interest comprises receiving an input of a polygon drawn on the map of the GUI.

In another embodiment of the fourth aspect, receiving the input of the area of interest comprises receiving an input of a radius around the address.

In another embodiment of the fourth aspect, the code, when executed by the processor, further causes the processor to receive as an input a case number or an incident number.

In another embodiment of the fourth aspect, the code, when executed by the processor, further causes the processor to receive as an input an incident type.

In another embodiment of the fourth aspect, the code, when executed by the processor, further causes the processor to, after returning as an output the video footage from the subset of the A/V recording and communication devices that are within the area of interest, indicate with icons on the map the locations of the subset of the A/V recording and communication devices that have the video footage meeting the requester's criteria, wherein each icon includes a number that indicates a number of videos associated with that A/V recording and communication device that meet all criteria input by the requester.

In another embodiment of the fourth aspect, returning as an output the video footage from the subset of the A/V recording and communication devices that are within the area of interest comprises displaying, on the GUI on the display of the client device, a list of videos.

In another embodiment of the fourth aspect, each video in the list includes identifying information, including the address where the A/V recording and communication device that recorded each video is located, and the date and time that each video was recorded.

In another embodiment of the fourth aspect, each video in the list includes a download icon or button that, when selected, causes the selected video to be downloaded to the client device.

In another embodiment of the fourth aspect, each video in the list includes a flag icon or button that, when selected, causes the selected video to be added to a group of flagged videos.

In another embodiment of the fourth aspect, the code, when executed by the processor, further causes the processor to receive as an input a command to narrow the list of videos to only those videos that are in the group of flagged videos.

In a fifth aspect, a non-transitory computer readable storage medium is provided, storing a program comprising instructions that, when executed by at least one processor of a server, cause the server to perform operations including: receiving video recorded by a plurality of camera devices; receiving at least one share consent from at least one client device granting consent to share video recorded by one or more of the plurality of camera devices; receiving a video request from a requesting device for video recorded by a subset of the plurality of camera devices located within a specified area and recorded during a specified time window; in response to the video request, identifying a subset of videos recorded by the subset of the plurality of camera devices located within the specified area and recorded during the specified time window, and for which the share consent has been received; and sending, to the requesting device, the subset of videos.

In an embodiment of the fifth aspect, the specified area is a location around an address received from the requesting device.

In another embodiment of the fifth aspect, the specified area is an area of interest indicated on a map.

In another embodiment of the fifth aspect, the time window is a specified date range.

In another embodiment of the fifth aspect, the specified time window includes a start time.

In another embodiment of the fifth aspect, the specified time window includes an end time.

In another embodiment of the fifth aspect, the end time is in the future.

In another embodiment of the fifth aspect, the non-transitory computer readable storage medium further comprises instructions that, when executed by the at least one processor, further cause the server to take as criteria the specified area and the specified time window, and use the criteria to search through video metadata to identify the subset of videos.

In another embodiment of the fifth aspect, the non-transitory computer readable storage medium further comprises instructions that, when executed by the at least one processor, further cause the server to identify a set of video metadata records.

In another embodiment of the fifth aspect, the at least one share consent is received prior to receiving the subset of videos.

In a sixth aspect, a method for at least one server for sharing video recorded by a subset of a plurality of camera devices, the method comprising: receiving, at the server(s), video recorded by a plurality of camera devices; receiving, at the server(s), at least one share consent from at least one client device granting consent to share video recorded by one or more of the plurality of camera devices; receiving, at the server(s), a video request from a requesting device for video recorded by a subset of the plurality of camera devices located within a specified area and recorded during a specified time window; in response to the video request, identifying, at the server(s), a subset of videos recorded by the subset of the plurality of camera devices located within the specified area and recorded during the specified time window, and for which the share consent has been received; and sending a video availability signal, from the server to the requesting device, wherein the video availability signal includes information about the subset of videos.

In an embodiment of the sixth aspect, the specified area is a location around an address received from the requesting device.

In another embodiment of the sixth aspect, the specified area is an area of interest indicated on a map.

In another embodiment of the sixth aspect, the time window is a specified date range.

In another embodiment of the sixth aspect, the specified time window includes a start time.

In another embodiment of the sixth aspect, the specified time window includes an end time.

In another embodiment of the sixth aspect, the end time is in the future.

In another embodiment of the sixth aspect, the method further comprises taking as criteria the specified area and the specified time window, and using the criteria to search through video metadata to identify the subset of videos.

In another embodiment of the sixth aspect, the method further comprises identifying, at the server(s), a set of video metadata records.

In another embodiment of the sixth aspect, the at least one share consent is received, at the server(s), prior to receiving, at the server(s), the subset of videos.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s).

What is claimed is:

1. A system comprising:
one or more processors; and
one or more computer-readable media storing instructions that, when executed by the one or more processors, cause the system to perform operations comprising:
storing location data associated with an electronic device,
receiving image data generated by the electronic device;
sending the image data to a first user device associated with the electronic device;
based at least in part on the sending of the image data, receiving, from the first user device, consent to share the image data;
receiving, from a second user device, a request that indicates at least an area and a time window;
determining, based at least in part on the location data, that a location associated with the electronic device is located within the area;
determining that the image data was generated during the time window;
determining that the consent has been received; and
sending, to the second user device, the image data.

2. The system of claim 1, wherein the request indicates a distance around an additional location associated with the second user device, the area corresponding to the distance around the additional location.

3. The system of claim 1, wherein the request indicates the area on a map.

4. The system of claim 1, wherein the time window includes a start time and an end time.

5. The system of claim 4, wherein the end time includes a future time.

6. A method comprising:
receiving image data generated by an electronic device;
sending the image data to a first user device associated with the electronic device;
based at least in part on the sending the of image data, receiving, from the first user device, consent to share the image data;
receiving, from a second user device, a first indication of an area around a first location associated with the second user device;
receiving, from the second user device, a second indication of a time window;
determining that a second location associated with the electronic device is located within the area;
determining that the image data was generated during the time window;
determining that the consent has been received; and
sending, to the second user device, information associated with the image data.

7. The method of claim 6, wherein the receiving of the first indication comprises receiving, from the second user device, the first indication of the area on a map.

8. The method of claim 6, wherein the receiving of the second indication comprises receiving, from the second user device, the second indication of the time window that includes a start time and an end time.

9. The system of claim 1, the one or more computer-readable media storing further instructions that, when executed by the one or more processors, cause the system to perform further operations comprising:
sending, to the second user device, information associated with the image data; and
receiving, from the second user device, an additional request for the image data,
wherein the sending of the image data is based at least in part on the receiving of the additional request.

10. The system of claim 1, the one or more computer-readable media storing further instructions that, when executed by the one or more processors, cause the system to perform further operations comprising:
storing first data representing a time that the electronic device generated the image data,
wherein the determining that the image data was generated during the time window comprises determining, using the first data, that the time is within the time window.

11. The system as recited in claim 1, wherein:
the area is a first area;
the consent indicates a second area associated with sharing the image data;
the location is a first location;
the second user device is associated with a second location; and
the one or more computer-readable media store further instructions that, when executed by the one or more processors, cause the system to perform further operations comprising determining that the second location is located within the second area.

12. The method of claim 6, further comprising:
receiving, from the second user device, a request for the image data; and
based at least in part on the receiving of the request, sending the image data to the second user device.

13. The method of claim 6, further comprising:
storing first data representing a time that the electronic device generated the image data,
wherein the determining that the image data was generated during the time window comprises determining, using the first data, that the time is within the time window.

14. The method of claim 6, further comprising:
storing location data associated with the electronic device,
wherein the determining that the second location associated with the electronic device is located within the area is based at least in part on the location data.

15. The method of claim 6, wherein the area is a first area and the consent indicates a second area associated with sharing the image data, and wherein the method further comprises
determining that the first location is located within the second area.

16. A system comprising:
one or more processors; and
one or more computer-readable media storing instructions that, when executed by the one or more processors, cause the system to perform operations comprising:
receiving, from a first user device, consent associated with an electronic device;
storing data that associates the consent with the electronic device;
receiving image data generated by the electronic device;
receiving, from a second user device, a first indication of an area;
determining that a location associated with the electronic device is located within the area;
receiving, from the second user device, a second indication of a time window;
determining that the electronic device generated the image data during the time window;
determining that the consent has been received for the electronic device; and
sending, to the second user device, the image data.

17. The system of claim 16, wherein the receiving of the first indication of the area and the receiving of the second indication of the time window comprises receiving, a request from the second user device, the request indicating the area and the time window.

18. The system of claim 16, the one or more computer-readable media storing further instructions that, when executed by the one or more processors, cause the system to perform further operations comprising:
based at least in part on the determining that the consent has been received, sending, to the second user device, information associated with the image data; and
receiving, from the second user device, a request for the image data,
wherein the sending of the image data to the second user device is based at least in part on the receiving of the request.

19. The system of claim 1, the one or more computer-readable media storing further instructions that, when executed by the one or more processors, cause the system to perform further operations comprising storing first data that associates the consent with the image data.

20. The system of claim 16, the one or more computer-readable media storing further instructions that, when executed by the one or more processors, cause the system to perform further operations comprising:
storing location data associated with the electronic device,
wherein the determining that the location associated with the electronic device is located within the area is based at least in part on the location data.

* * * * *